(12) United States Patent
Yamaguchi et al.

(10) Patent No.: US 11,397,326 B2
(45) Date of Patent: Jul. 26, 2022

(54) HEAD-MOUNTED DISPLAY

(71) Applicant: SEIKO EPSON CORPORATION, Tokyo (JP)

(72) Inventors: Tokito Yamaguchi, Azumino (JP); Masayuki Takagi, Azumino (JP); Toshiaki Miyao, Chino (JP); Akira Komatsu, Kamiina-gun (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/105,681

(22) Filed: Nov. 27, 2020

(65) Prior Publication Data

US 2021/0165227 A1    Jun. 3, 2021

(30) Foreign Application Priority Data

Nov. 28, 2019   (JP) .............................. JP2019-215062

(51) Int. Cl.
*G02B 27/01*        (2006.01)

(52) U.S. Cl.
CPC .. *G02B 27/0172* (2013.01); *G02B 2027/0112* (2013.01); *G02B 2027/0118* (2013.01)

(58) Field of Classification Search
CPC ........ G02B 27/0172; G02B 2027/0112; G02B 2027/0118
See application file for complete search history.

(56) References Cited

U.S. PATENT DOCUMENTS

| | | | |
|---|---|---|---|
| 8,681,073 B1* | 3/2014 | Robbins ........... | H04N 21/42202 345/7 |
| 2007/0018124 A1* | 1/2007 | Nishi ................. | G02B 27/0025 250/559.36 |
| 2014/0327360 A1* | 11/2014 | Hoshino ................ | H05B 45/22 315/151 |
| 2021/0341702 A1* | 11/2021 | He ........................... | G02B 7/02 |

FOREIGN PATENT DOCUMENTS

JP    2007-065012 A    3/2007

* cited by examiner

*Primary Examiner* — Robert J Michaud
(74) *Attorney, Agent, or Firm* — Oliff PLC

(57) ABSTRACT

A panel unit configured to, for imaging light, use different opening ratios depending on a wavelength band for displaying an image, a yellowing optical member that is disposed on an optical path of imaging light emitted from the panel unit, and turns yellow with age, a yellowing degree estimation unit configured to estimate, by prediction, a yellowing degree of the yellowing optical member with age, and a luminance adjustment unit configured to, depending on yellowing of the yellowing optical member, based on data of the yellowing degree estimation unit, adjust luminance of an image in the panel unit, are provided.

12 Claims, 17 Drawing Sheets

HEAD-MOUNTED DISPLAY

The present application is based on, and claims priority from JP Application Serial Number 2019-215062, filed Nov. 28, 2019, the disclosure of which is hereby incorporated by reference herein in its entirety.

BACKGROUND

1. Technical Field

The present disclosure relates to a head-mounted display (HMD) that presents an image to a user.

2. Related Art

A head-mounted display (HMD) worn on a head of a user (observer) has been known in which, for example, as described in JP-A-2007-65012, a detection unit disposed between a display element and a projection optical system detects light emitted from a light-emitting element, and by comparing and adjusting amounts of light from respective light sources in accordance with detection results, white balance of imaging light to be exited is adjusted.

However, in JP-A-2007-65012, although light emission intensity is adjusted for each the light-emitting element in order to adjust the white balance, there is a possibility that a lifespan of the light-emitting element shortens by increasing an amount of injection current in order to increase the light emission intensity. In this case, due to a limit of an amount of light emitted that can be exited by the light-emitting element associated with a light emission lifespan, a state may occur in which it becomes difficult for hueing to be fully corrected, thereby changing the hueing of a display screen.

SUMMARY

A head-mounted display of one aspect of the present disclosure includes a display element configured to, for imaging light including red light, green light and blue light use different opening ratios depending on a wavelength band for displaying an image, a yellowing optical member that is disposed on an optical path of imaging light emitted from the display element, and turns yellow with age, a yellowing degree estimation unit configured to estimate, by prediction or detection, a yellowing degree of the yellowing optical member with age, and a luminance adjustment unit configured to, depending on yellowing of the yellowing optical member, based on data of the yellowing degree estimation unit, adjust luminance of an image in the display element.

DESCRIPTION OF EXEMPLARY EMBODIMENTS

First Exemplary Embodiment

Below, a head-mounted display (HMD) according to a first exemplary embodiment of the present disclosure will be described in detail with reference to FIG. 1.

Figure 1:
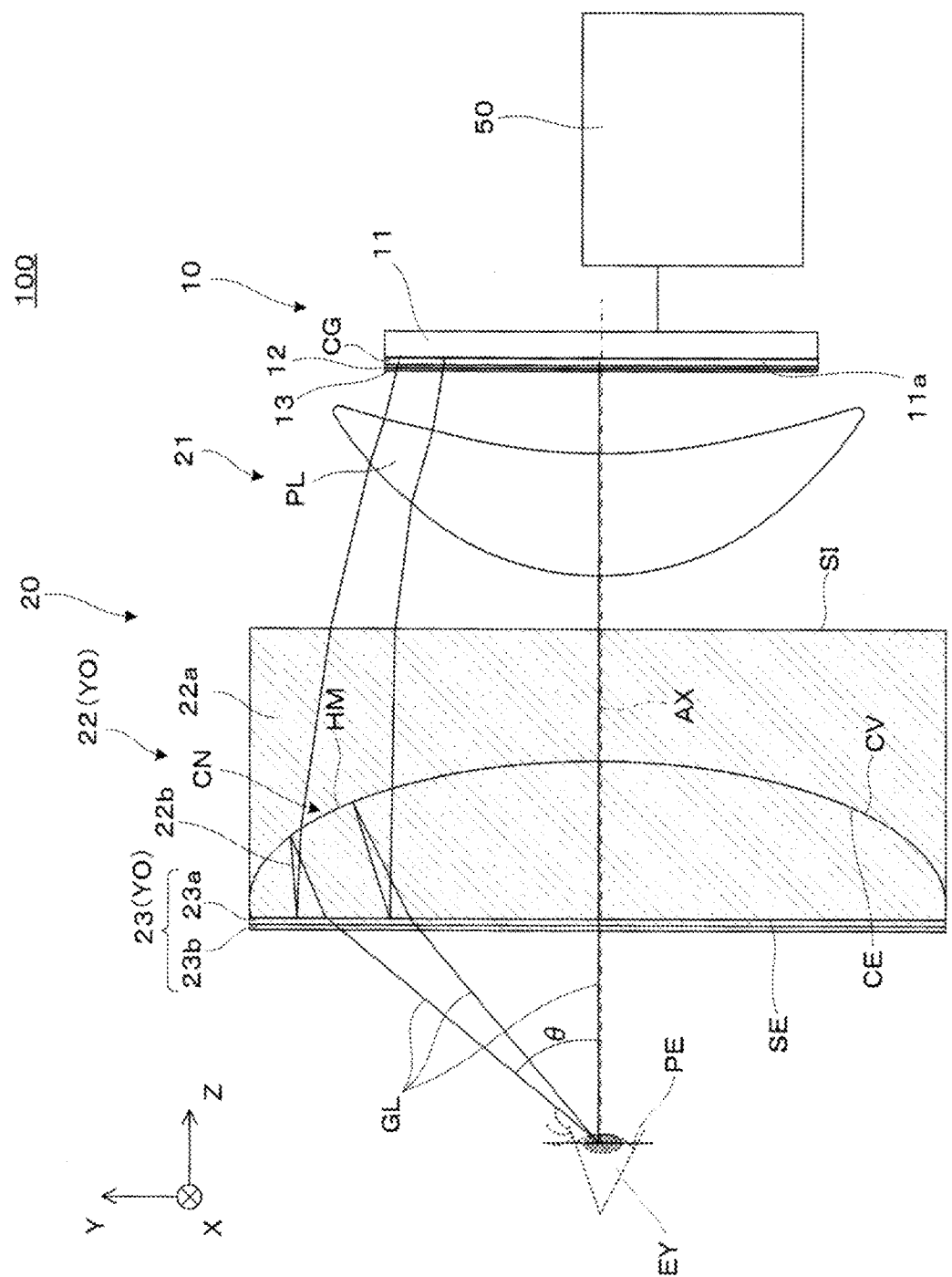
FIG. 1 is a side cross-sectional view conceptually describing a head-mounted display (HMD) according to a first exemplary embodiment.

As conceptually illustrated in FIG. 1, a head-mounted display (HMD) 100 according to the present exemplary embodiment includes an image display unit 10 configured with a display element (image display unit) and the like, an enlargement optical system 20, and an image control device 50, and serves as a virtual image display device capable of causing a user or an observer wearing the HMD 100 to visually recognize imaging light (image light) by a virtual image. Here, FIG. 1 conceptually illustrates a state of a cross section as viewed from a side when the user wears the HMD 100. It is assumed in FIG. 1 and the like that an optical axis AX of an optical system in the HMD 100 is a Z direction. Further, among in-plane directions of a surface orthogonal to the Z direction, a horizontal direction, that is, a right-left direction is an X direction, and among the in-plane directions, a direction orthogonal to the X direction is a Y direction. In this case, the horizontal direction assumed to be a direction in which right and left eyes of the user are aligned is the X direction. Then, an up-down direction for the user which is a direction orthogonal to the horizontal direction is a vertical direction, and is the Y direction in FIG. 1 and the like. Also, in FIG. 1, assumed as a position of an eye EY of the user when using the HMD 100 (when observing using the HMD 100) is a position PE of a pupil on a configuration of the HMD 100. Here, as illustrated, a direction from the position PE of the pupil toward the image display device 10, that is, a gaze direction for the eye EY of the user is a +Z direction.

Note that the image display device 10 and the enlargement optical system 20 are prepared for each of the right eye and the left eye and are each in a right-left pair configuration, but here, since a configuration of a left side and a configuration of a right side are symmetric, only one side (for the right eye) of the right and left sides is illustrated, and the other side is omitted. For example, in FIG. 1, an ear (right ear) is located in a −X direction with respect to the eye EY of the user, and a nose is located in a +X direction with respect to the eye EY of the user. Note that in the HMD 100, only one of the left and right pair of structures also functions as the virtual display device, namely, functions independently. Additionally, the virtual image display device can also be configured for a single eye without the right-left pair configuration.

The image control device 50 is configured with various control circuits and the like, and performs operational control for display operation in the image display device 10. In particular, here, the image control device 50 functions, for example, as a luminance adjustment unit AM or the like that adjusts luminance of an image in the image display device 10 including the display element. Note that, the various control circuits and the like described above can be configured to include any one or more circuits such as a digital signal processor (DSP), an Application Specific Integrated Circuit (ASIC), a Programmable Logic Device (PLD), a Field Programmable Gate Array (FPGA), a Graphics Processing Unit (GPU), a Central Processing Unit (CPU).

An example of structure and the like of each of units for guiding imaging light by the HMD 100 will be described conceptually below.

First, in the HMD 100, the image display device 10 includes a panel unit 11 being a main body part to form an image and configured to exit imaging light GL, and a protection glass CG being a cover glass for covering a light-exiting surface 11a of the panel unit 11. Note that, in addition to the above, the image display device 10 includes a polarizing plate 12 and an incident side polarization conversion member 13, and adjusts a polarization state of the imaging light (image light) GL emitted from the panel unit 11. Here, a small panel unit is adopted as the panel unit 11 in the image display device 10, and as in the figure, the image display device 10 is configured, at least, to be smaller than the enlargement optical system 20, with respect to a direction orthogonal to the optical axis AX. Specifically, for example, in the example in the illustration, a size of an image display area (or a panel size) of the image display device 10 is smaller than a size of each lens that constitutes the enlargement optical system 20 described later.

The panel unit 11 being a display device can be a display element (image display element) including a self-light-emitting type element (OLED) such as an organic electro-luminescence (EL), for example. The panel unit 11 may be, for example, a self-light-emitting type display element (image element) represented by an inorganic EL, an LED array, a laser array, a quantum dot light emitting element, and the like in addition to the organic EL. The panel unit 11 forms a still image or a moving image in color in the two-dimensional light-exiting surface 11a. The panel unit 11 is, for example, driven by a drive control circuit constituting the image control device 50 to perform a display operation. When an organic EL display is used as the panel unit 11, the panel unit 11 includes an organic EL control unit. When a quantum dot display is used as the panel unit 11, light of blue light emitting diode (LED) passes through a quantum dot film to produce a green or red color.

Here, from a viewpoint of definition enhancement or the like, as a display element used for the panel unit 11 of the image display device 10, for example, a case where a small display element such as a micro display is desirably adopted is conceivable. Since there is a proportional relationship between a panel size and a panel unit price for, for example, a liquid crystal panel using an HIPS or Si backplane, or an OLED panel, these panels need to be applied to realize definition enhancement. That is, from a practical viewpoint of reducing a product cost or the like, a smaller panel needs to be applied. However, when miniaturing a panel is attempted while an angle of view is widened, that is, when applying a smaller panel size is attempted, a focal distance of an optical system also needs to be reduced. That is, a curvature radius of a lens needs to be reduced. In this case, in a component of light in a wide visual field angle side, due to a restriction of a total reflection condition in a lens surface, a shape having strong curvature cannot be adopted, and desirable reduction in a panel size may not be achieved. In the HMD 100 of the present exemplary embodiment, in view of the above, miniaturization of the panel unit 11 is realized. Note that, a length of a side of the panel size in the panel unit 11 may be equal to or less than 2.5 inches, further may be equal to or less than 1 inch (may be, about 12 to 13 mm) from a viewpoint of demand for reduction in size. In the exemplary embodiment, a small panel such as a micro display is used as the image display device 10, and an image by this panel is enlarged by the enlargement optical system 20, and thus an image having a wide angle of view can be formed.

In addition to the above, the image display device 10 is provided with the polarizing plate 12 and the incident side polarization conversion member 13. The polarizing plate 12 is stuck on the light-exiting surface of the protection glass CG. The polarizing plate 12 is a transmissive polarizing plate, and is a member for extracting a linearly polarized light of the imaging light GL when the imaging light GL from the panel unit 11 passes through the member. The incident side polarization conversion member 13 is a quarter wavelength plate, that is, a λ/4 plate, and converts a polarization state of light passing through. That is, the incident side polarization conversion member 13 is located downstream of an optical path of the polarizing plate 12, and converts the imaging light GL passing through the polarizing plate 12 and being the linearly polarized light to circularly polarized light. Note that, a mounting aspect of the polarizing plate 12, the incident side polarization conversion member 13, and the like described above is an example, and can be changed as appropriate as far as an intended polarization state can be maintained.

Next, in the HMD 100, the enlargement optical system 20 includes a projection lens 21, a bonding lens 22, and a transmission/reflection selection member 23.

The projection lens 21 is a convex lens or a convex meniscus lens (is a convex meniscus lens in the example in the figure, but may be a convex lens) that is provided immediately downstream from the image display device 10, and emits the imaging light GL from the image display device 10 toward rear optical members disposed downstream the optical path (on a −Z side). To rephrase, in the enlargement optical system 20, the projection lens 21 is a before-side lens that is disposed at a position closest to the image display device 10 and adjusts the optical path of the imaging light GL. By introducing the projection lens 21, a resolution performance can be improved, and further, a panel size in the image display device 10 can be reduced. Accordingly, it is also possible to reduce a manufacturing cost of the image display device 10. In addition, since a telecentric angle of a light beam emitted from the image display device 10 can also be reduced, generation of variations in luminance and chromaticity due to panel visual field angle characteristics can be suppressed. Here, in the illustrated example, the projection lens 21 is constituted by one lens PL (convex meniscus lens), but the lens PL may be a convex lens. Further, the projection lens 21 may be constituted by a plurality of lenses.

The bonding lens 22 is configured by bonding two lenses, namely, a concave lens 22a and a convex lens 22b, that are arranged in that order from a side of the image display device 10 or a +Z side, and a joining section CN formed by including a half mirror HM is provided between the concave lens 22a and the convex lens 22b.

First, the concave lens 22a, in the bonding lens 22, is a planoconcave lens disposed closer to the side of the image display device 10 (+Z side) than the convex lens 22b, includes a concave surface CE on a front-of-eye side (−Z side) of the user, and includes a light incident plane SI being a flat surface as a light incident surface to which the imaging light GL from the image display device 10 is incident on the side of the image display device 10 being an opposite side to the concave surface CE. A refractive index of the concave lens 22a is smaller than a refractive index of the convex lens 22b. Further, the concave surface CE includes a spherical surface with a curved surface shape corresponding to a convex surface CV of the convex lens 22b. That is, the concave lens 22a is a spherical surface planoconcave lens.

Next, the convex lens 22b is a planoconvex lens disposed, closer to the front-of-eye side of the user than the concave lens 22a, on an extracting location for extracting the imaging light GL to an outside of a device, includes a light-exiting surface SE being a flat surface as a light-exiting surface on the front-of-eye side, and includes the convex surface CV on the side of the image display device 10 being an opposite side to the light-exiting surface SE. The convex lens 22b is formed, by mixing additives with a specific glass material or a resin material, or the like, as a highly refractive lens with a refractive index of 1.8 or larger, for example, so as to obtain an image with a sufficiently wide angle of view. Further, the convex surface CV is a spherical surface. That is, the convex lens 22b is a spherical surface planoconvex lens. Here, the convex lens 22b is a high refractive index member having a higher refractive index than that of any other optical member of optical members disposed on the optical path of the imaging light GL.

The convex lens 22b and the concave lens 22a are bonded with the convex surface CV and the concave surface CE, and form the joining section CN. The joining section CN is provided with the half mirror HM that is a semi-reflective and semi-transmissive film for transmitting part of the imaging light GL and reflecting another part of the imaging light GL. Note that, the half mirror HM is formed of, for example, a dielectric multilayer film, a metal film, or the like, and is provided in the joining section CN, thus, has a concave curved surface shape when viewed from a side of the user.

Additionally, both the light-exiting surface SE and the light incident surface SI are parallel to the light-exiting surface 11a of the image display device 10. In the illustrated example, the surfaces are parallel to an XY plane. Note that, as a tolerance of parallelism here, for example, within ±2° is conceivable.

The transmission/reflection selection member 23 is provided on a light exiting side of the convex lens 22b, includes an exiting side polarization conversion member 23a, and a semi-transmissive reflection type polarizing plate 23b, and selectively performs transmission or reflection according to a polarization state of light.

The exiting side polarization conversion member 23a of the transmission/reflection selection member 23 is a quarter wavelength plate, that is, a λ/4 plate, and converts a polarization state of light passing through. As illustrated, the exiting side polarization conversion member 23a is stuck on the light-exiting surface SE of the convex lens 22b, and is provided between the convex lens 22b and the semi-transmissive reflection type polarizing plate 23b. The exiting side polarization conversion member 23a converts a polarization state of a component traveling back and forth between the semi-transmissive reflection type polarizing plate 23b and the half mirror HM. Here, the exiting side polarization conversion member 23a being the quarter wavelength plate converts the imaging light GL being in a state of circular polarization of light to linearly polarized light, or, conversely, converts the imaging light GL being in a state of linear polarization of light to circularly polarized light.

The semi-transmissive reflection type polarizing plate 23b of the transmission/reflection selection member 23 is stuck on the light-exiting surface SE via the exiting side polarization conversion member 23a. That is, the semi-transmissive reflection type polarizing plate 23b is a member disposed in a side closest to the position PE of the pupil assumed as the position of the eye EY of the user, and emits the imaging light GL toward the front-of-eye side of the user. Here, the semi-transmissive reflection type polarizing plate 23b includes a reflective type wire grid polarizing plate. That is, the semi-transmissive reflection type polarizing plate 23b changes a transmission/reflection characteristic depending on whether a state of polarization of an incident component is in a polarization transmission axis direction or not. In this case, since the exiting side polarization conversion member 23a is disposed upstream of an optical path of the semi-transmissive reflection type polarizing plate 23b, a polarization state of light changes each time the light passes through the exiting side polarization conversion member 23a, and the semi-transmissive reflection type polarizing plate 23b transmits or reflects the incident component according to the change. Here, as an example, the horizontal direction (X direction) assumed as a direction in which the eyes of the user are arranged is a polarization transmission axis direction. Note that the semi-transmissive reflection type polarizing plate 23b including the reflection type wire grid polarizing plate changes the transmission/reflection characteristic according to a state of polarization of the incident component, and thus, may also be referred to as a reflection type polarizing plate.

The transmission/reflection selection member 23 includes the exiting side polarization conversion member 23a, and the semi-transmissive reflection type polarizing plate 23b as described above, and thus can change a polarization state of light and according to the change, selectively transmit or reflect the light.

The optical path of the imaging light GL will be described below briefly with reference to FIG. 1. First, the imaging light GL modulated in the panel unit 11 in the image display device 10 is converted to linearly polarized light in the polarizing plate 12 being the transmissive polarizing plate. Here, a polarization direction of the linearly polarized light having passed through the polarizing plate 12 is a first direction. After the imaging light GL is converted to the linearly polarized light in the first direction by the polarizing plate 12, the imaging light GL is converted to circularly polarized light by the incident side polarization conversion member 13 being a first quarter wavelength plate, and is exited toward the enlargement optical system 20 through a light-guiding unit LG.

The imaging light GL exited is incident on the concave lens 22a from the light incident surface SI located closest to a side of the image display device 10 of the enlargement optical system 20. Thereafter, the imaging light GL reaches the joining section CN provided with an interface between the concave lens 22a and the convex lens 22b, that is, the half mirror HM. Some components of the imaging light GL pass through the half mirror HM, and are converted to linearly polarized light by the exiting side polarization conversion member 23a being a second quarter wavelength plate. Here, after the linearly polarized light passes through the polarizing plate 12, the linearly polarized light passes through the quarter wavelength plate twice, and thus the polarization direction of the linearly polarized light is a different direction by 90° with respect to the first direction. Here, this direction is referred to as a second direction. After the imaging light GL is converted to the linearly polarized light in the second direction by the exiting side polarization conversion member 23a, the imaging light GL reaches the semi-transmissive reflection type polarizing plate 23b (reflection type polarizing plate).

Here, the semi-transmissive reflection type polarizing plate 23b is set to transmit linearly polarized light in the first direction, and reflect linearly polarized light in the second direction. From another perspective, a transmission characteristic of the polarizing plate 12 or a transmission/reflection selection characteristic of the semi-transmissive reflection type polarizing plate 23b is configured as such. In this case, the imaging light GL being the linearly polarized light in the second direction is reflected by the semi-transmissive reflection type polarizing plate 23b, and again becomes circularly polarized light in the exiting side polarization conversion member 23a being the quarter wavelength plate, and reaches the half mirror HM. At the half mirror HM, some components of the imaging light GL pass through as they are, but remaining components are reflected, and the components of the imaging light GL reflected are this time converted to the linearly polarized light in the first direction by the exiting side polarization conversion member 23a being the quarter wavelength plate. The components of the imaging light GL converted to the linearly polarized light in the first direction pass through the semi-transmissive reflection type polarizing plate 23b, and the imaging light GL reaches the position of the pupil PE assumed as a location in which the eye EY of the user exists.

As described above, in the enlargement optical system 20 of the HMD 100 of the present exemplary embodiment, a folding optical system is constituted that folds the optical path of the imaging light GL by the joining section CN provided with the half mirror HM and the transmission/reflection selection member 23. In other words, the folding optical system includes the convex lens 22b having the convex surface CV on a side of the image display device 10, the concave lens 22a disposed closer to the image display device 10 than the convex lens 22b and having the concave surface CE bonded to the convex surface CV of the convex lens 22b, and the half mirror HM provided in the joining section CN between the convex surface CV and the concave surface CE. By using reflection on the half mirror HM provided on a curved surface of the folding optical system, the imaging light GL can have a wide angle of view.

Here, as described above, in the optical members disposed on the optical path of the imaging light GL emitted from the panel unit 11 being the display element, a yellowing optical member YO that turns yellow with age may be used. In the illustrated example, a part or all of the bonding lens 22 and transmission/reflection selection member 23 illustrated as hatched is formed of the yellowing optical member YO.

In the HMD 100, when the yellowing optical member YO is used in the optical member disposed on the optical path, as time elapses, in the imaging light GL including red light, green light and blue light in particular, transmittance of the blue light is reduced, and even when light emission balance is maintained as is at the panel unit 11, white balance for an image that is visually recognized is to deteriorate with age. Compared to this, in order to adjust the white balance, for example, in the panel unit 11 of a self-light-emitting type, light emission intensity may be adjusted for each light-emitting element, but in this case, a lifespan of the light-emitting element may shortens, for example, by increasing an amount of injection current to increase the light emission intensity. On the other hand, a yellowing degree of the yellowing optical member YO with age can be predicted (estimated) to some degree depending on a material used, an installation environment of the yellowing optical member YO, and the like. In light of the above, in the present exemplary embodiment, an aspect is adopted in which, in the image control device 50 as a yellowing degree estimation unit YE, the yellowing degree of the yellowing optical member YO with age is predicted, and further, in the image control device 50 as the luminance adjustment unit AM, while luminance adjustment is performed for an image in accordance with yellowing prediction for the yellowing optical member YO, the image is displayed at different opening ratios depending on wavelength bands respectively in the panel unit 11. Accordingly, luminance adjustment for an image is performed and white balance is adjusted with age, and shortening of a light emission lifespan of a display element is suppressed.

First, a configuration example of the image control device 50 as the yellowing degree estimation unit YE and the luminance adjustment unit AM will be described with reference to the block diagram of FIG. 2.

As illustrated, the image control device 50 in the present exemplary embodiment includes a main control unit 51, a storage unit 52, a timer 53, and an interface 60.

The main control unit 51 is constituted by various control circuits and the like, represented by a CPU, and performs various kinds of control related to a display operation of an image in the image display device 10. In particular, in the present exemplary embodiment, the main control unit 51, in order to function as the luminance adjustment unit AM, includes a luminance control unit 51a that adjusts luminance of imaging light according to each color light that is, for each wavelength band. The luminance control unit 51a, in order to adjust luminance for each color light in an entirety of the imaging light GL, controls an amount of injection current for a light-emitting element of each color, for example, in the panel unit 11 of the self-light-emitting type, and adjusts light emission intensity.

The storage unit 52 is constituted by various storage devices, and the like, and various computer programs and types of data are stored in the storage unit 52. In particular, in the present exemplary embodiment, the storage unit 52, in order to cause the image control device 50 to function as the yellowing degree estimation unit YE, stores prediction table data 52a. The prediction table data 52a stores data related to a change in degree of yellowing (yellowing degree) with age in accordance with material properties of the yellowing optical member YO, the installation environment, and the like.

The timer 53 can be a variety of aspects, but is capable of timing for performing luminance adjustment each half a year from a time of product shipment, for example. In addition, in order to perform various types of processing required, the timing may be performed at a period shorter than half a year.

Also, the timing may be started from a time of initial activation of a product, instead of the time of product shipment.

The interface 60 is coupled to the panel unit 11, and outputs various command signals generated in the main control unit 51 to the panel unit 11 for various types of image display operations including luminance adjustment. In other words, various image signals that are controlled to provide an image for which light emission balance is adjusted in terms of visual recognition are transmitted, from the panel unit 11.

Figure 3:
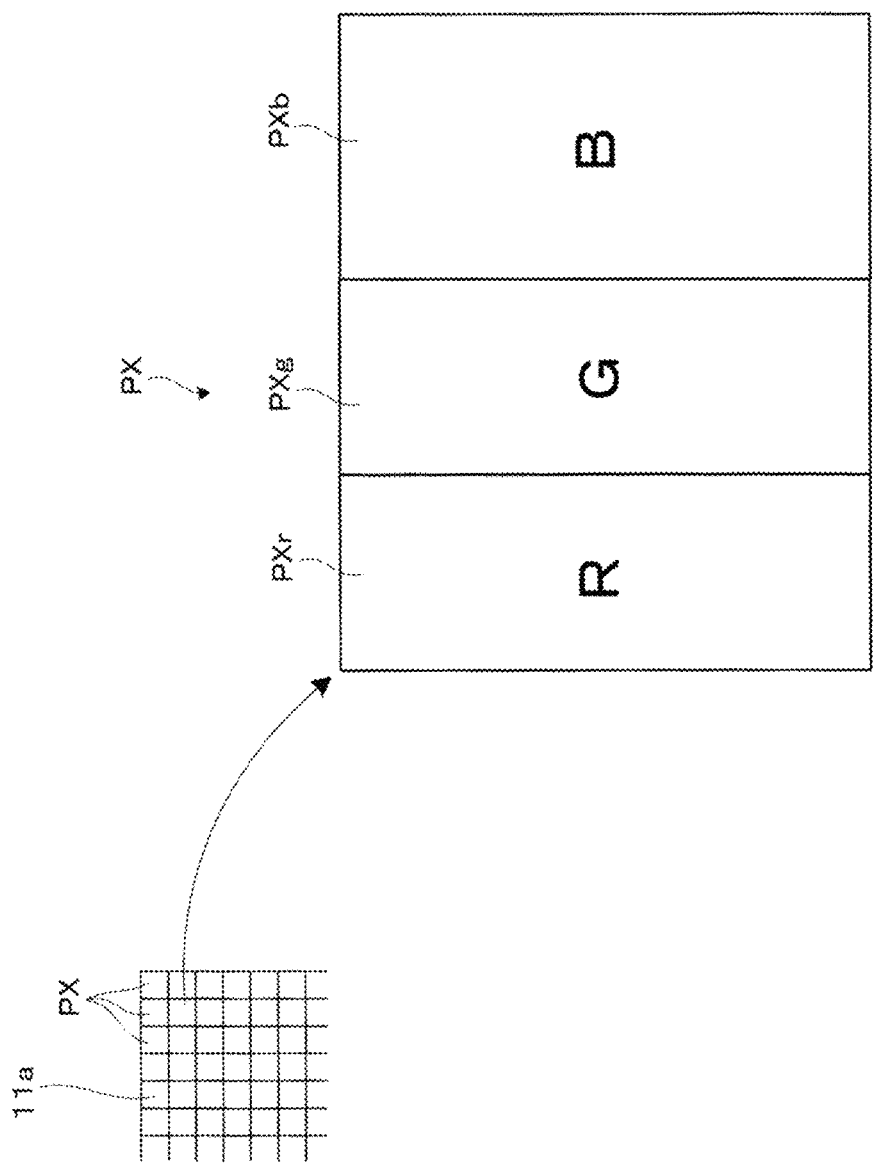
FIG. 3 is a conceptual diagram of a pixel opening portion illustrating an example of opening ratios.

Next, an example will be described with reference to FIG. 3 for an opening ratio in accordance with a wavelength band in the panel unit 11. FIG. 3 is a conceptual diagram of a pixel opening portion constituting a plurality of pixels PX arranged in a matrix on the light-exiting surface 11a of the panel unit 11 to illustrate an example of the opening ratio. As illustrated, here, one number of the pixel PX includes a sub-pixel PXr that emits red light R, a sub-pixel PXg that emits green light G, and a sub-pixel PXb that emits blue light B, and respective opening ratios of the colors are different from each other. Specifically, in the illustrated example, a ratio of the sub-pixel PXb is greater than that of each of the sub-pixel PXr and the sub-pixel PXg. In this case, at the time of product shipment, luminance of the sub-pixel PXb, that is, luminance of the blue light B, is lowered relative to the other color light components R and G, so it is possible to maintain a light emission lifespan of blue even when the luminance of the blue light B is raised after a lapse of time. In other words, in the present exemplary embodiment, the luminance is adjusted among the red light R, the green light G, and the blue light B in accordance with the difference between the opening ratios as described above. Accordingly, for each of the color light components (in particular, the blue light B), in luminance adjustment with age, balance of the colors as a whole can be maintained, while lifespans of the respective light-emitting elements are maintained. Note that, it is conceivable to define wavelength bands of the respective color light components R, G, and B, for example, such that the wavelength band of the red light R is from 580 nm to 700 nm, the wavelength band of the green light G is 495 nm to 580 nm, and the wavelength band of the blue light B is from 400 nm to 500 nm.

Figure 2:
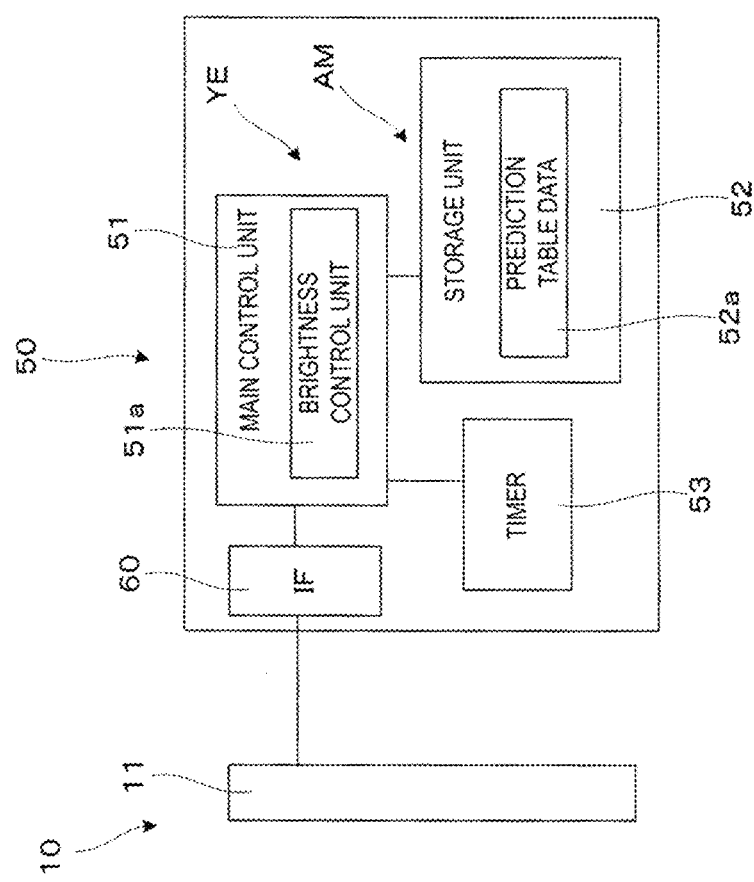
FIG. 2 is a block diagram for describing a configuration example of an image control device.

Referring now to FIG. 2, an example of a method of the luminance adjustment with age in the present exemplary embodiment will be described. First, the main control unit 51, based on measurement by the timer 53, checks whether it is a time to perform the luminance adjustment with age or not. When determining that it is a time to perform the luminance adjustment, the main control unit 51, as the yellowing degree estimation unit YE, reads the data related to the yellowing degree of the yellowing optical member YO predicted based on the material properties of the yellowing optical member YO stored in the prediction table data 52a of the storage unit 52. In other words, the main control unit 51, as the yellowing degree estimation unit YE, estimates the yellowing degree of the yellowing optical member YO with age by prediction. Next, the main control unit 51, as the luminance control unit 51a, in accordance with the yellowing of the yellowing optical member YO, adjusts luminance of an image in the panel unit 11 based on the data of the yellowing degree estimation unit YE. As described above, the respective units constituting the image control device 50 function as the yellowing degree estimation unit YE and the luminance adjustment unit AM, and thus the luminance adjustment is performed in accordance with the yellowing degree of the yellowing optical member YO.

A description will be given below with reference to various graphs illustrated in FIG. 4, and the like, based on an example of more specific data, regarding the luminance adjustment in association with the yellowing of the optical member as described above.

Figure 4:
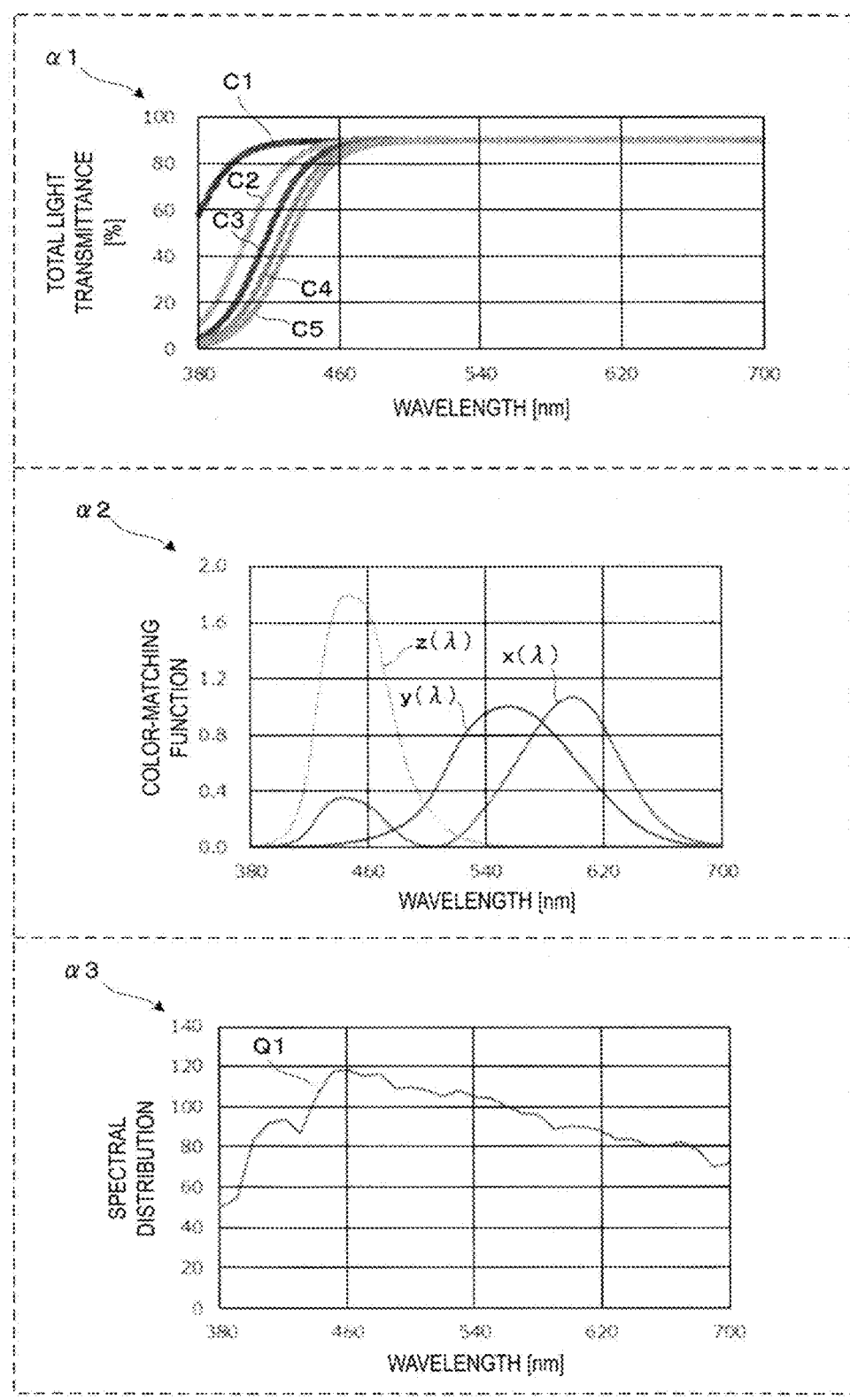
FIG. 4 includes graphs showing an example for various types of numerical data.

First, data α1 shown in a top section of FIG. 4 is a graph showing a typical example of total light transmittance in a plastic material used in the yellowing optical member YO. In the illustration, a horizontal axis indicates wavelength λ (unit: nm), and a vertical axis indicates the total light transmittance. Of five curves C1 through C5, the curve C1 shows the total light transmittance at a time of product shipment, the curve C2 shows the total light transmittance when half a year passed after the product shipment, the curve C3 shows the total light transmittance when a year passed after the product shipment, the curve C4 shows the total light transmittance when one and half a year passed after the product shipment, and the curve C5 shows the total light transmittance when two years passed after the product shipment. As shown, it can be seen that the transmittance in a bandwidth on a short wavelength side, that is, in a wavelength band of the blue light decreases with age. Here, when normal usage of the HMD 100 is assumed, an optical component that employs the yellowing optical member YO is handled as one that turns yellow in accordance with the data α1 described above.

Next, data α2 shown in a middle section of FIG. 4 is an example of a function that is commonly known as a color-matching function for an eye. That is, in the data α2, a horizontal axis indicates wavelength λ (unit: nm) and a vertical axis indicates value of the color-matching function, and the color-matching function for an eye is expressed by three curves x(λ), y(λ), and z(λ).

Finally, data α3 shown in a bottom section of FIG. 4 shows spectral distribution of white display in a light-emitting unit used as an example here. Note that, the light-emitting unit here, emits light evenly for each color, and for example, opening ratios of the respective colors are identical to each other (one-third for each of a red color, a green color, and blue color, when an entirety of an opening area is defined as 1). In addition, in the illustration, a horizontal axis indicates wavelength λ (unit: nm), a vertical axis indicates spectral distribution, and a curve Q1 indicates the spectral distribution of white display emitted by the light-emitting unit. Note that, here, an example is illustrated in which broadband light is emitted that is uniformly distributed at high value as a whole for a wavelength band.

According to the above assumptions, when a characteristic of the total light transmittance of the yellowing optical member YO shown in data α1 is R(λ), the color-matching function for an eye shown in the data α2 is expressed as described above, by x(λ), y(λ), and z(λ), and the spectral distribution of white display shown in the data α3 is p(λ), then tristimulus values XYZ indicating a degree of influence of the yellowing optical member YO in image display can be calculated from the following formulae.

$$X = \int R(\lambda) P(\lambda) x(\lambda) d\lambda$$

$$Y = \int R(\lambda) P(\lambda) y(\lambda) d\lambda$$

$$Z = \int R(\lambda) P(\lambda) z(\lambda) d\lambda$$

Furthermore, from the above tristimulus values, xy chromaticity coordinates can be calculated based on the following formulae.

$$x = \frac{X}{X+Y+Z}$$
$$y = \frac{Y}{X+Y+Z}$$

In the above, for example, assuming that the white display in the light-emitting unit shown in the data α3 is 100 cd/m², according to the above calculation, the tristimulus values XYZ and the xy chromaticity coordinates of image light when two years passed after the time of product shipment are as shown in Table 1.

TABLE 1

| ITEM | TIME OF PRODUCT SHIPMENT | HALF YEARS | ONE YEAR | ONE AND HALF YEARS | TWO YEARS |
|---|---|---|---|---|---|
| X | 94.936 | 93.960 | 92.908 | 91.888 | 90.900 |
| Y | 100.000 | 100.000 | 100.000 | 100.000 | 100.000 |
| Z | 108.315 | 103.226 | 97.610 | 92.030 | 86.487 |
| x | 0.313 | 0.316 | 0.320 | 0.324 | 0.328 |
| y | 0.330 | 0.336 | 0.344 | 0.352 | 0.361 |

Brightness of each the color in this case is calculated based on the following formula.

$$\begin{bmatrix} L_R \\ L_G \\ L_B \end{bmatrix} = \begin{bmatrix} x_R/y_R & x_G/y_G & x_B/y_B \\ 1 & 1 & 1 \\ (1-x_R-y_R)/y_R & (1-x_G-y_G)/y_G & (1-x_B-y_B)/y_B \end{bmatrix}^{-1} \begin{bmatrix} X \\ Y \\ Z \end{bmatrix}$$

Here, of the above, $L_R$ indicates luminance of red light in the light-emitting unit, and $x_R$ and $y_R$ indicate xy chromaticity of the red light R in the light-emitting unit. Similarly, $L_G$, and $x_G$ and $y_G$ indicate luminance and xy chromaticity of the green light G in the light-emitting unit, respectively, and $L_B$, and $x_B$ and $y_B$ indicate luminance and xy chromaticity of the blue light B in the light-emitting unit, respectively. Here, when an example of the xy chromaticity of each of the red light R, the green light G, and the blue light B is set as shown in Table 2, a change in the luminance of each the color with age is as illustrated in Table 3.

TABLE 2

|   | R | G | B |
|---|---|---|---|
| x | 0.64 | 0.3 | 0.15 |
| y | 0.33 | 0.6 | 0.06 |

TABLE 3

| ITEM | TIME OF PRODUCT SHIPMENT | HALF YEARS | ONE YEAR | ONE AND HALF YEARS | TWO YEARS |
|---|---|---|---|---|---|
| R | 21.251 | 21.118 | 20.988 | 20.877 | 20.784 |
| G | 71.575 | 72.101 | 72.663 | 73.204 | 73.725 |
| B | 7.174 | 6.781 | 6.349 | 5.919 | 5.492 |

That is, it can be seen that, with age, the luminance of the blue light B decreases, compared to the luminance of each of the other color light components R and G. That is, in this case, along with the yellowing of the yellowing optical member YO, a display screen also yellows.

Compared to this, in the present exemplary embodiment, as described above, the luminance of the blue light B is increased with age to correct white balance of an image. Specifically, in a case of an example showing the characteristics as described above, it can be seen that, as shown in Table 4 below, when the luminance of the blue light B is newly defined and the luminance is gradually raised to about 1.3 times until two years pass since the time of product shipment, the luminance of the blue light B is maintained, and thus white balance of an entire image can be maintained.

TABLE 4

| ITEM | TIME OF PRODUCT SHIPMENT | HALF YEARS | ONE YEAR | ONE AND HALF YEARS | TWO YEARS |
|---|---|---|---|---|---|
| B' | 7.174 | 7.143 | 7.199 | 7.252 | 7.304 |
| X | 94.936 | 94.863 | 95.033 | 95.222 | 95.430 |
| Y | 100.000 | 100.361 | 100.850 | 101.334 | 101.812 |
| Z | 108.315 | 107.982 | 108.800 | 109.589 | 110.347 |
| x | 0.313 | 0.313 | 0.312 | 0.311 | 0.310 |
| y | 0.330 | 0.331 | 0.331 | 0.331 | 0.331 |
| B INCREASE AMOUNT (/BRIGHTNESS AT TIME OF PRODUCT SHIPMENT) |  | 105.3% | 113.4% | 122.5% | 133.0% |

Furthermore, as described above, in expectation of making the luminance of the blue light B about 1.3 times after two years, that is, in expectation of an increase in an amount of injection current to the sub-pixel PXb (see FIG. 3) that emits the blue light B, for example, an opening ratio $S_B$ of the blue light B is defined as the following formula.

$$S_B = \frac{1}{3} * 1.3 = 0.43$$

In other words, the opening ratio $S_B$ of the blue light B is set to approximately 0.43, with bias applied, rather than setting to ⅓ (about 0.33) so as to be equal to the respective opening ratios of the other red light R and green light G. Note that, in this case, the respective opening ratios of the red light and the green light are, for example, each set to be approximately 0.29. Accordingly, at the time of product shipment, that is, in an initial state, even when the luminance of the blue light B is relatively low, by adjusting white balance of an image, and increasing the luminance of the blue light B with age, it is possible to maintain the white balance of an image in consideration of the yellowing of the yellowing optical member YO. Note that, when a perspective is changed, for the red light R and the green light G each having the opening ratio relatively small, the luminance is to be set to be relatively high with respect to the luminance of the blue light B. That is, in the case described above, an aspect is adopted in which, in the panel unit 11 being the display element, the opening ratio of the blue light B is larger than the opening ratio of each of the red light R and the green light G, and the luminance adjustment unit AM increases the luminance of each of the red light R and the green light G to be larger than the luminance of the blue light B in the initial state, and increases the luminance of the blue light B in accordance with the yellowing of the yellowing optical member YO with age. Accordingly, a difference between the opening ratios is used to ensure a required range of the luminance adjustment within a range of optimal emission efficiency, for example, in a light source of the blue light B.

As described above, the head-mounted display (HMD) 100 according to the present exemplary embodiment includes the image display device 10 including the panel unit 11 that is the display element for displaying an image with different opening ratios depending on the respective wavelength bands, for the imaging light GL including the red light R, the green light G, and the blue light B, the yellowing optical member YO that is disposed on the optical path of the imaging light GL emitted from the panel unit 11 and yellows with age, the main control unit 51 that is the yellowing degree estimation unit YE for estimating the yellowing degree of the yellowing optical member YO with age by prediction and the prediction table data 52*a*, and the luminance control unit 51*a* that is the luminance adjustment unit AM for adjusting luminance of an image in the panel unit 11 based on the data of the yellowing degree estimation unit YE, in accordance with the yellowing of the yellowing optical member YO.

In the HMD 100 described above, the panel unit 11, for the red light R, the green light G, and the blue light B, has the different opening ratios in accordance with the wavelength bands respectively, and in the luminance control unit 51*a* of the image control device 50, and adjusts luminance of an image, in accordance with the yellowing of the yellowing optical member YO based on the data. Accordingly, white balance adjustment is possible for an image, while being compatible with life-span characteristics that are different for the respective wavelength bands on a light-emitting side, that is, a side of the panel unit 11, and yellowing characteristics in the yellowing optical member YO.

Figure 5:
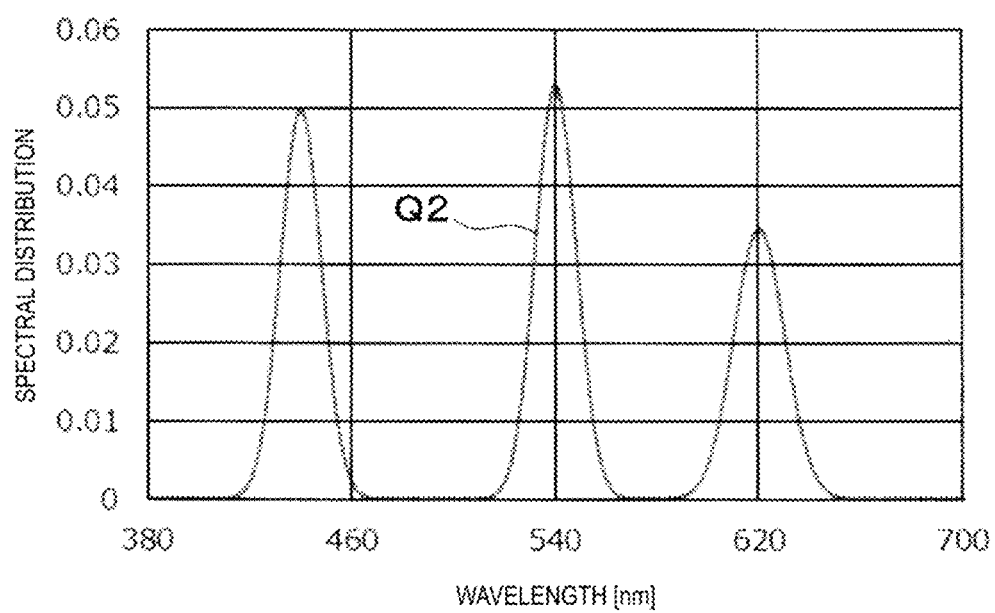
FIG. 5 is a graph showing an example of numerical data in a modified example.

A modified example will be described below with reference to a graph in FIG. 5. FIG. 5 corresponds to the data α3 in FIG. 4. That is, in the illustration, a horizontal axis indicates wavelength (unit: nm), a vertical axis indicates spectral distribution, and a curve Q2 indicates the spectral distribution of white display emitted by a light-emitting unit. In the example in FIG. 4, whereas broadband light that is uniformly distributed at high value as a whole for a wavelength band is emitted, the example here is different in that the spectral distribution of the white display in the light-emitting unit is peaky. Note that, the data α1 and α2 shown in FIG. 4 are the same.

Tables 5 to 7 below show tristimulus values XYZ, xy chromaticity coordinates, and the like in the above aspect, and correspond to Tables 1, 3, and 4 described above, respectively. Note that, an example of xy chromaticity of each the color is the same as in Table 2.

TABLE 5

| ITEM | TIME OF PRODUCT SHIPMENT | HALF YEARS | ONE YEAR | ONE AND HALF YEARS | TWO YEARS |
|---|---|---|---|---|---|
| X | 100.004 | 98.684 | 96.934 | 95.033 | 93.080 |
| Y | 100.000 | 100.000 | 100.000 | 100.000 | 100.000 |
| Z | 122.590 | 115.682 | 106.490 | 96.461 | 86.105 |
| x | 0.310 | 0.314 | 0.319 | 0.326 | 0.333 |
| y | 0.310 | 0.318 | 0.330 | 0.343 | 0.358 |

TABLE 6

| ITEM | TIME OF PRODUCT SHIPMENT | HALF YEARS | ONE YEAR | ONE AND HALF YEARS | TWO YEARS |
|---|---|---|---|---|---|
| R | 27.579 | 27.415 | 27.200 | 26.970 | 26.738 |
| G | 65.932 | 66.467 | 67.175 | 67.943 | 68.732 |
| B | 6.489 | 6.119 | 5.625 | 5.087 | 4.531 |

TABLE 7

| ITEM | TIME OF PRODUCT SHIPMENT | HALF YEARS | ONE YEAR | ONE AND HALF YEARS | TWO YEARS |
|---|---|---|---|---|---|
| B' | 6.489 | 6.540 | 6.607 | 6.681 | 6.756 |
| X | 100.004 | 99.976 | 99.948 | 99.924 | 99.907 |
| Y | 100.000 | 100.421 | 100.982 | 101.594 | 102.225 |
| Z | 122.590 | 123.542 | 124.819 | 126.205 | 127.627 |
| x | 0.310 | 0.309 | 0.307 | 0.305 | 0.303 |
| y | 0.310 | 0.310 | 0.310 | 0.310 | 0.310 |
| B INCREASE AMOUNT (/BRIGHTNESS AT TIME OF PRODUCT SHIPMENT) | | 106.9% | 117.5% | 131.3% | 149.1% |

In this case, from the results in Table 7, it can be seen that, when luminance of the blue light B is newly defined and the luminance is gradually raised to about 1.5 times until two years pass since a time of product shipment, the luminance of the blue light B is maintained, and thus white balance of an entire image can be maintained. Thus, in this case, the opening ratio $S_B$ of the blue light B is, for example, defined as the following formula, and opening ratio of each of red light and green light defined as about 0.25, for example.

$$S_B = \frac{1}{3} * 1.5 = 0.5$$

The following formula is generally known for yellowness YI.

$$YI = 100 * (1.2985 * X - 1.1335 * Z)/Y$$

For example, yellowness $YI_0$ at the time of product shipment, that is, in an initial state, and yellowness $YI_x$ with age (for example, two years later) are obtained by assigning the values in Table 7 to the above formula and performing calculation. Compared to this, a difference between the yellowness $YI_x$ and the yellowness $YI_0$, that is, a degree of yellowing $\Delta Yi$ of the yellowing optical member YO that yellowed with age from the initial state (for example, two years later) is expressed as the following formula.

$$\Delta YI = YI_x - YI_0$$

That is, the degree of yellowing $\Delta YI$ can be calculated from respective values of the yellowness $YI_x$ and the yellowness $YI_0$. In the above, when luminance of the blue light B at the time of product shipment, that is, in the initial state is $LB_0$, and luminance $LB_x$ of the blue light B in a current state that yellowed with age (for example, two years later), relative to the degree of yellowing $\Delta YI$, that is a current degree of yellowing after yellowing with age, satisfies the following formula, it is conceivable that white balance can be maintained.

$$LB_0 * (0.005 * \Delta YI + 1) \leq LB_x \leq LB_0 (0.030 * \Delta \Delta YI + 1)$$

In addition, in consideration of the above two examples and the like in which the characteristics of the spectral distribution of the white display on the light-emitting side described above are different, when the opening ratio $S_B$ of the blue light B to an entire opening area satisfies the following formula, in luminance adjustment of the blue light B in accordance with the yellowing with age from the time of product shipment (for example, two years later), the luminance adjustment can be performed while maintaining a luminance lifespan of the blue light B, and taking luminance maintenance of the other color light components R and G, and the like in to consideration.

$$0.3 < S_B \leq 0.6$$

Figure 6:
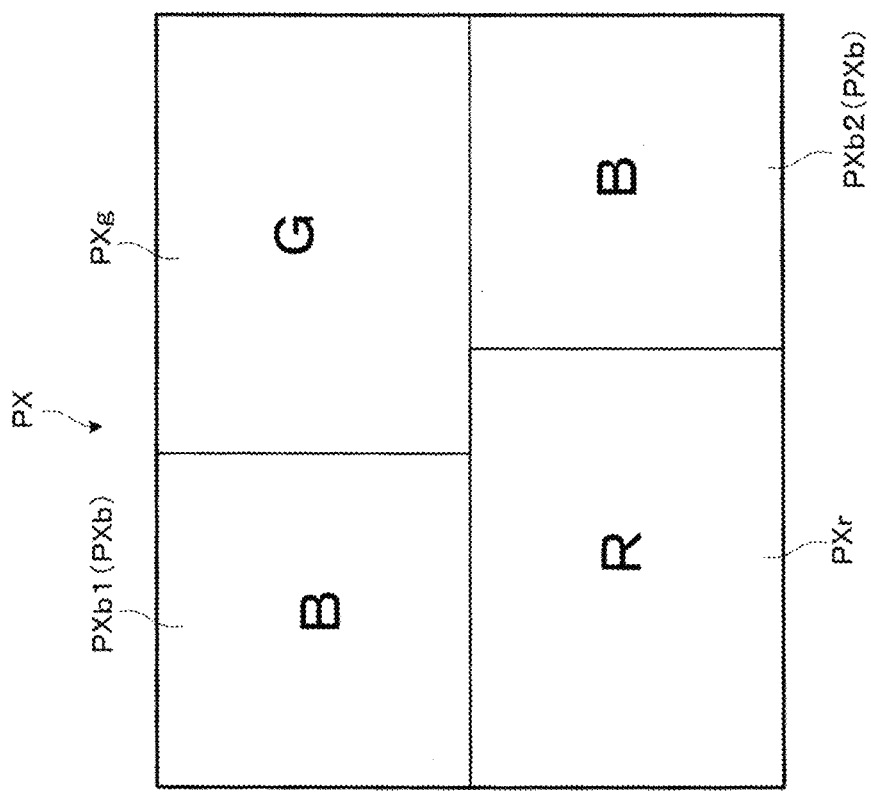
FIG. 6 is a conceptual diagram illustrating a modified example of the pixel opening portion.

A modified example of the pixel opening portion will be described below with reference to FIG. 6. FIG. 6 is a diagram corresponding to FIG. 3, that is a conceptual diagram of one number of the pixel PX constituting the light-exiting surface 11a, and differs from the example in FIG. 3 in that, whereas one number of the sub-pixel PXr and one number of the sub-pixel PXg are present, the sub-pixel PXb is constituted by two sub-pixels PXb1 and PXb2. In other words, the sub-pixel PXb having a largest area is divided into two. This makes it possible to reduce a screen-door effect.

Figure 7:
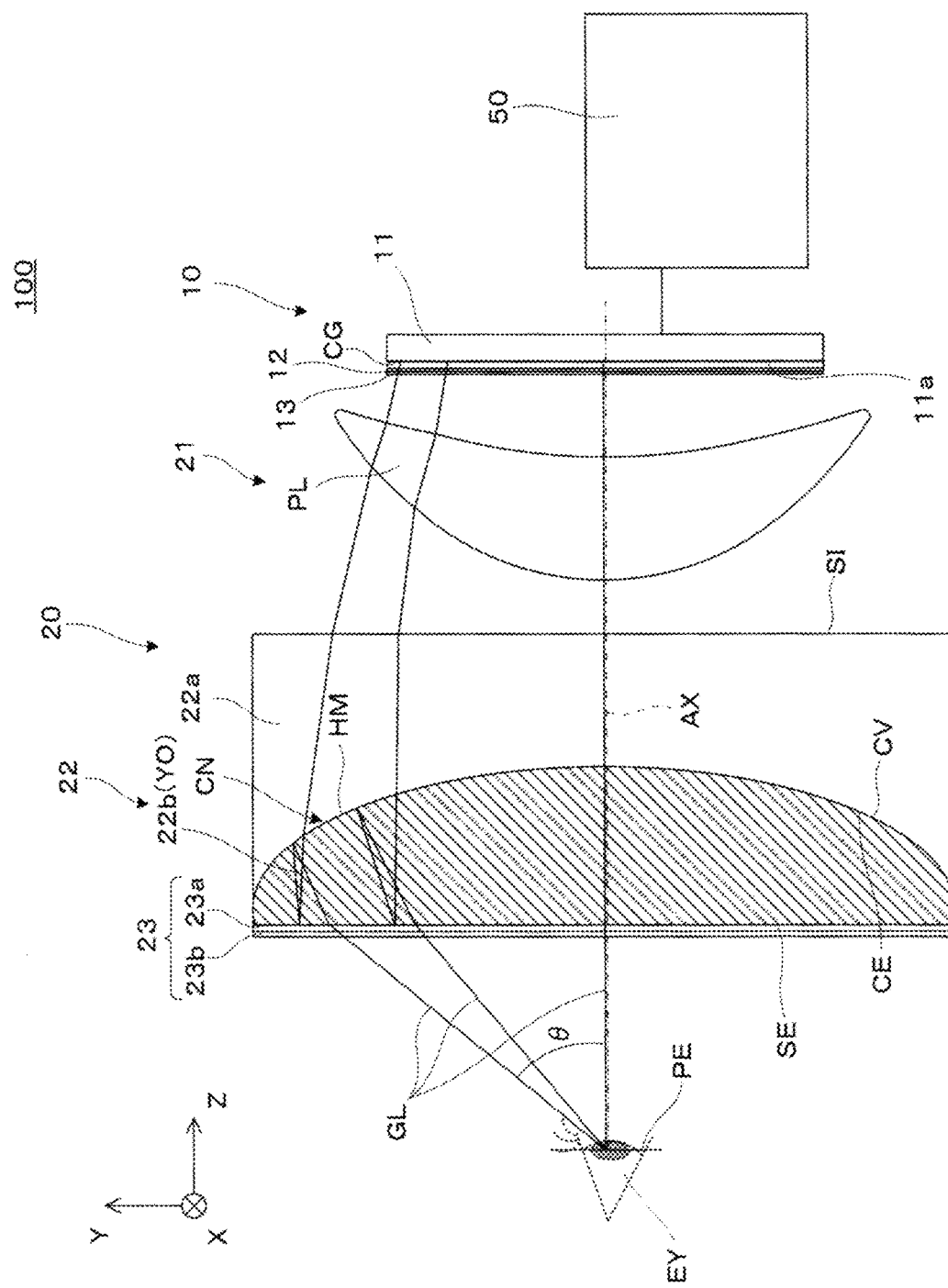
FIG. 7 is a side cross-sectional view conceptually describing an HMD according to another modified example.

Hereinafter, the HMD 100 according to yet another modified example will be described with reference to FIG. 7. FIG. 7 is a side cross-sectional view for conceptually describing the other modified example of the HMD 100, and corresponds to FIG. 1. The present modified example differs from the case in FIG. 1 in that, as illustrated by hatching, only the convex lens 22b constituting the bonding lens 22 is formed of the yellowing optical member YO.

As described above, in the case of the above-described configuration, the convex lens 22b may be formed of a high refractive index member having a refractive index of equal to or larger than 1.8, for example. In this case, it is conceivable that, for the convex lens 22b, preparation of a colorless transparent resin material or a glass material that satisfies a certain degree of optical transparency or more, or the like, is impossible or extremely difficult due to cost or the like, and it is conceivable to use a material that highly tends to yellow. In such cases, by applying the present application, the problems associated with the yellowing can be solved.

Widening an angle of view and visibility in the HMD 100 will be discussed below. In general, in a virtual image display device such as an HMD, widening of an angle of view has progressed, while maintaining miniaturization, assuming attachment to a human head. Thus, in an optical system, a focal length is very short. For example, as for a field of view (FOV), that is, a visual field (angle of view) in the HMD 100 illustrated in FIG. 1 and FIG. 7 in the present exemplary embodiment as well, it is assumed that a half angle of view θ is set to approximately 40° to 50°, that is, a full angle of view is set to approximately 80° to 100°. To satisfy this, for example, it is conceivable to adopt a configuration in which, for each dimension, an entire length of the enlargement optical system 20 is approximately 14 mm, a length of an eye relief is approximately 10 mm, and a diameter of an eye ring is approximately 6 mm. Additionally, a radius of curvature of a lens surface, that is, a radius of curvature of each of the convex surface CV of the convex lens 22b, and the concave surface CE of the concave lens 22a is approximately 44 mm. For example, as for visibility, color discrimination range of a human eye is approximately ±20°, and a rotational range of an eyeball is approximately ±20°, thus, an excellent image can be formed, particularly by maintaining white balance for a range of the full angle of view FOV of ±40°, that is, for the half angle of view illustrated in the figure.

Second Exemplary Embodiment

An example of an HMD according to a second exemplary embodiment will be described with reference to FIG. 8, and the like.

The HMD according to the present exemplary embodiment is a modified example of the HMD illustrated in the first exemplary embodiment, and differs from the first exemplary embodiment in that, when estimating a yellowing degree in the yellowing degree estimation unit YE, not only prediction based on previously stored data is performed, but also detection of a change in the yellowing degree in a current state is performed, and the detection results are reflected. However, other configurations except those described above are similar to those of the first exemplary embodiment, and thus descriptions regarding an entirety of the HMD will be omitted.

Figure 8:
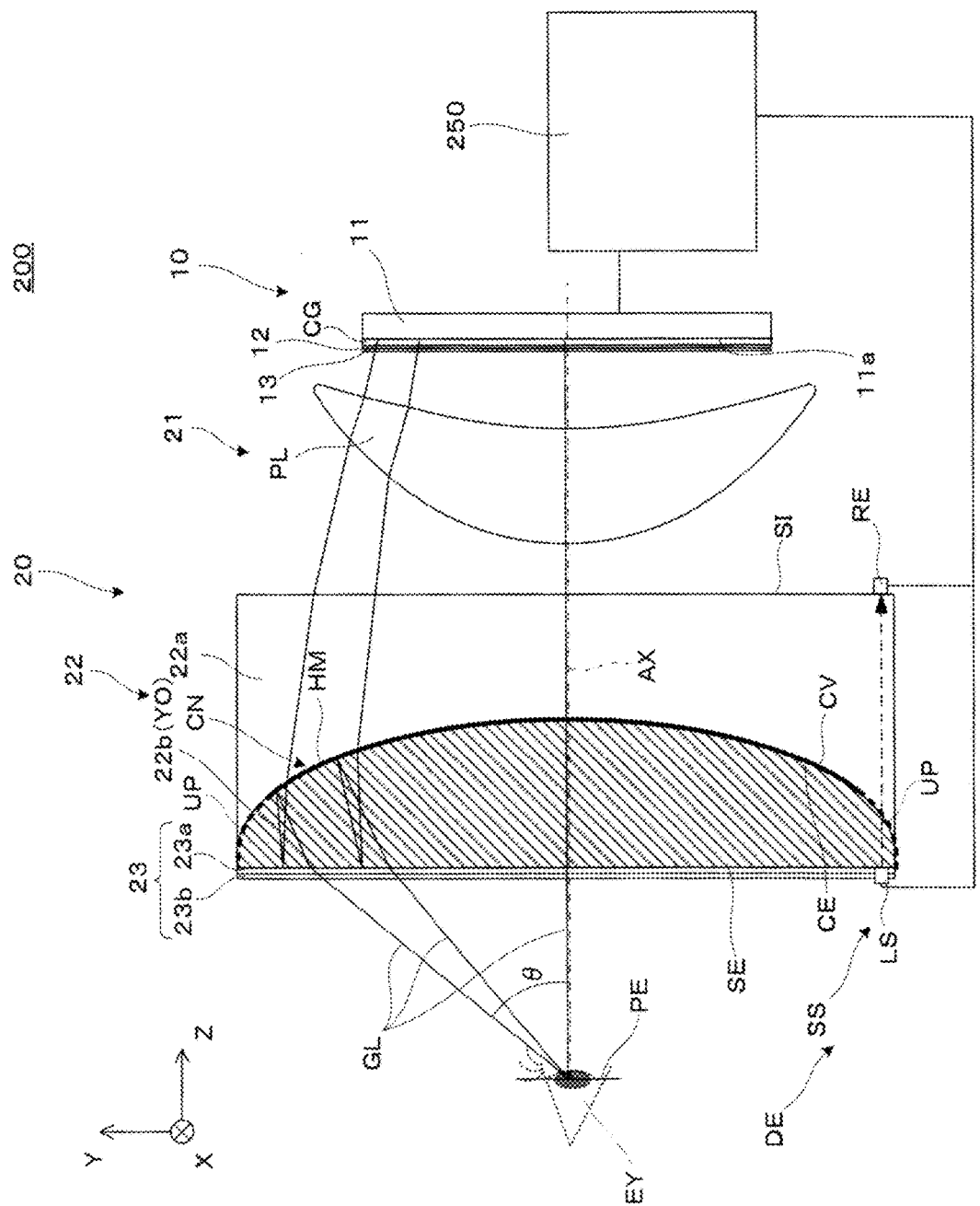
FIG. 8 is a side cross-sectional view conceptually describing an HMD according to a second exemplary embodiment.

FIG. 8 is a side cross-sectional view conceptually describing an HMD 200 according to the present exemplary embodiment, and is a figure corresponding to FIG. 1 and the like. As illustrated, the HMD 200 includes the image display device 10, the enlargement optical system 20, and an image control device 250. Note that, in the example here, as in the case of FIG. 7, a case will be described as an example in which only the convex lens 22b constituting the enlargement optical system 20 is formed of the yellowing optical member YO. In other words, in this example, the convex lens 22b is a target of prediction for a change in yellowing degree, and is also a target for which a change in yellowing degree in a current state is detected (inspection target).

Figure 9:
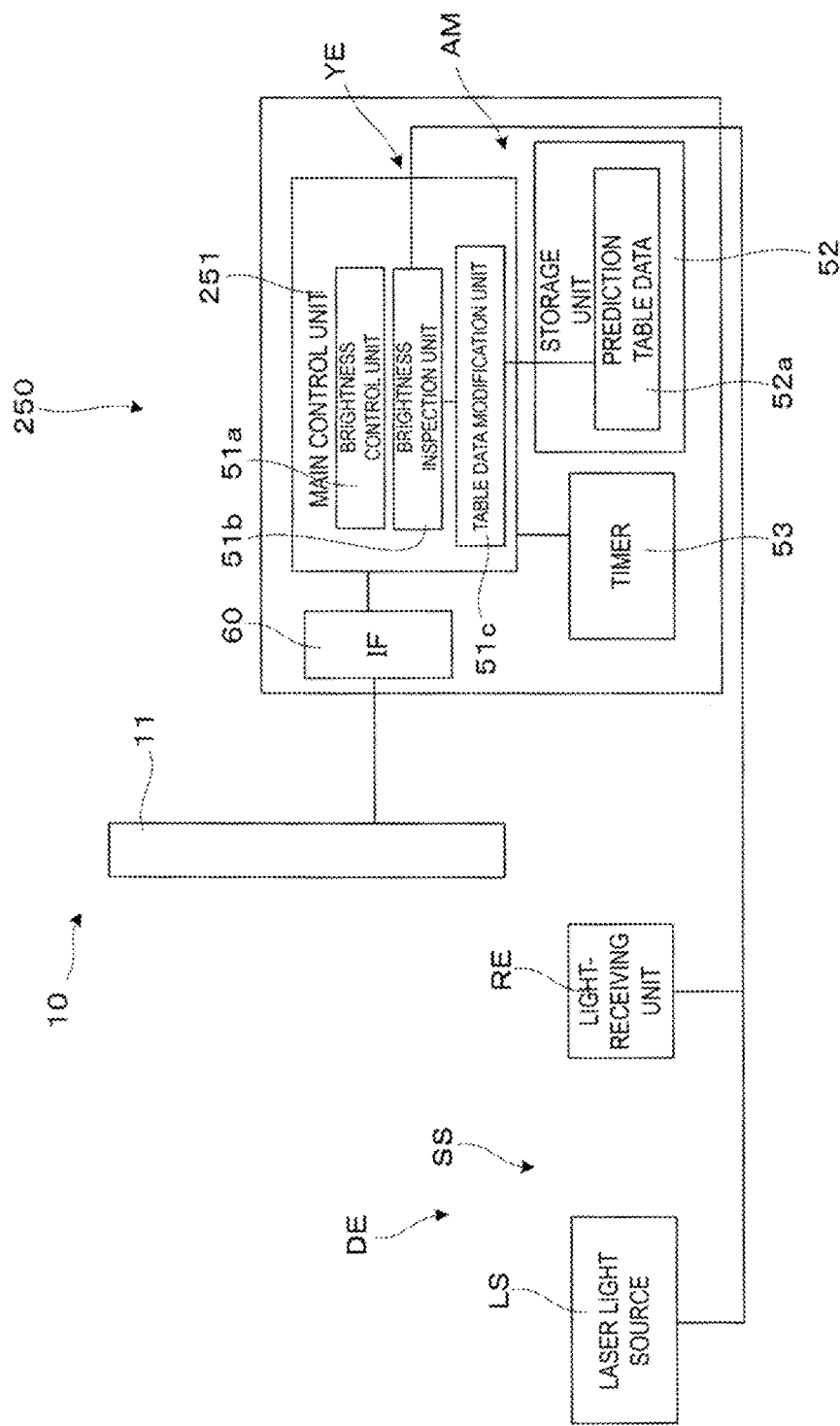
FIG. 9 is a block diagram for describing a configuration example of an image control device.

In the HMD 200, a sensor SS is provided as a sensor that constitutes an inspection device DE that inspects the yellowing degree in the current state of the yellowing optical member YO. Further, FIG. 9 is a block diagram illustrating, of the HMD 200, a configuration example of the image control device 250 including the sensor SS constituting the inspection device DE, and is a figure corresponding to FIG. 2 and the like.

The sensor SS is constituted by a laser light source LS that generates blue laser light, and a light-receiving unit RE that measures an amount of light received from the laser light source LS by having a photodiode or the like. In other words, the sensor SS detects the blue laser light passing through the yellowing optical member YO. Note that, the sensor SS performs measurement for inspecting a yellowing degree at a predetermined timing as necessary, in accordance with control by the image control device 250.

In the HMD 200 of the example illustrated in FIG. 8, as a premise for performing detection (inspection) of a change in yellowing degree by the sensor SS, first, a half mirror unapplied region UP in which the half mirror HM is not formed is provided, in the joining section CN formed by including the half mirror HM, of the enlargement optical system 20. Note that, the half mirror unapplied region UP is a region through which the imaging light GL does not pass, that is, a region on a peripheral side away from the optical axis AX, and does not affect image display. For example, the half mirror unapplied region UP can be provided, outside a range where the half angle of view θ is approximately 40° to 50°.

In addition, the laser light source LS and the light-receiving unit RE constituting the sensor SS are disposed, at respective positions that pass through the convex lens 22b that is the yellowing optical member YO and are not affected by the half mirror HM. More specifically, in the illustrated example, the laser light source LS and the light-receiving unit RE are disposed at respective positions that sandwich the bonding lens 22 along an optical path, and blue laser light emitted from the laser light source LS passes through the convex lens 22b, and through the half mirror unapplied region UP and the concave lens 22a (non-yellowing optical component), and is detected in the light-receiving unit RE, and a detection result is outputted to the image control device 250. In this way, the image control device 250, based on the detection by the sensor SS, estimates a yellowing degree of the yellowing optical member YO.

A configuration example of the image control device 250 will be described in greater detail below with reference to FIG. 9.

First, as illustrated, the image control device 250 includes a main control unit 251, the storage unit 52, the timer 53, and the interface 60, as well as the sensor SS. Further, of these, in addition to the luminance control unit 51a, the main control unit 251 includes a luminance inspection unit 51b, and a table data modification unit 51c. This point is different from the case illustrated in FIG. 2. Note that, of the above, the sensor SS and the luminance inspection unit 51b cooperate to function as the inspection device DE.

The luminance inspection unit 51b, in order to function as the inspection device DE, receives a light-receiving result detected by the light-receiving unit RE of the sensor SS, and performs a luminance inspection, based on this result. For example, the luminance inspection unit 51b records the light-receiving result each time, and compares a most recent light-receiving result with a previous light-receiving result, calculates a degree of progression of yellowing from the difference, and estimates a yellowing degree, that is, a change in degree of yellowing of the yellowing optical member YO, based on a result of the calculation. In other words, the inspection device DE including the luminance inspection unit 51b and the sensor SS functions as part of the yellowing degree estimation unit YE.

In the main control unit 251, the luminance control unit 51a compares estimation based on data related to a yellowing degree of the yellowing optical member YO stored in the prediction table data 52a with estimation based on an inspection result in the luminance inspection unit 51b, and estimates a yellowing degree of the yellowing optical member YO based on a result of the comparison.

The table data modification unit 51c, when it is determined that, from the comparison result for the estimation described above in the main control unit 251, modification is necessary for the prediction table data 52a, creates modification data, and rewrites the prediction table data 52a to be stored in the storage unit 52.

The aspect is adopted in which, the luminance adjustment associated with the yellowing of the yellowing optical member YO using the sensor SS as described above is performed at least every half a year, as described above, and an aspect is conceivable in which the luminance adjustment is performed when the HMD 200 is activated for the first time after half a year passes, but for example, inspection may be performed at shorter intervals, such as every day, every month, or every quarter, to perform the luminance adjustment, and check for presence or absence of deviation from the prediction. In addition, in the case of the above-described aspect, the sensor SS is disposed at a location that does not affect image display, thus, even during an image display operation by the HMD 200 (during a main operation), an inspection operation can also be performed in parallel with the main operation. Thus, for example, an aspect may also be adopted in which, when an inspection timing is reached during the main operation, the luminance adjustment is performed in parallel.

An example of operation of the HMD 200 according to the present exemplary embodiment will be described below with reference to a flowchart in FIG. 10. Note that, here, as an operational example of luminance adjustment associated with yellowing of the yellowing optical member YO using the sensor SS, among various operations, a case will be described in which luminance adjustment of blue light is performed in advance of a main operation when the HMD 200 is activated.

When respective units of the HMD 200 are activated, the main control unit 251 measures an amount of luminance by the sensor SS, in advance of the main operation. In other words, the luminance inspection unit 51b of the main control unit 251 emits blue laser light from the laser light source LS, measures an amount of received light detected in the light-receiving unit RE, and performs a luminance inspection based on the amount (step S201). As described above, a yellowing degree at a current time of the yellowing optical member YO (convex lens 22b) is inspected.

Next, the main control unit 251 performs data comparison between a result of the inspection (measurement result) in step S201 and prediction table data (step S202). In other words, whether the prediction table data is aligned with a state actually measured or not is checked.

When a result of the comparison in step S202 indicates that there is no difference equal to or larger than a specified difference (step S203: No), the yellowing of the yellowing optical member YO is determined to proceed as expected, and the processing ends without particularly performing a subsequent process.

On the other hand, when the result in the comparison in step S202 indicates that there is a difference equal to or larger than the specified difference (step S203: Yes), that is, when the yellowing of the yellowing optical member YO proceeds differently from the prediction at a time of product shipment, and it is determined that the prediction table data 52a needs to be modified, in the table data modification unit 51c, in order to rewrite the prediction table data 52a, first, calculation of a correction amount for luminance of the blue light B (creation of modification data) is performed (step S204). Thereafter, the table data modification unit 51c, based on a result of the calculation, rewrites the prediction table data 52a to be stored in the storage unit 52 (step S205), and ends the series of processes. As described above, the luminance adjustment for the luminance of the blue color is performed.

Figure 11:
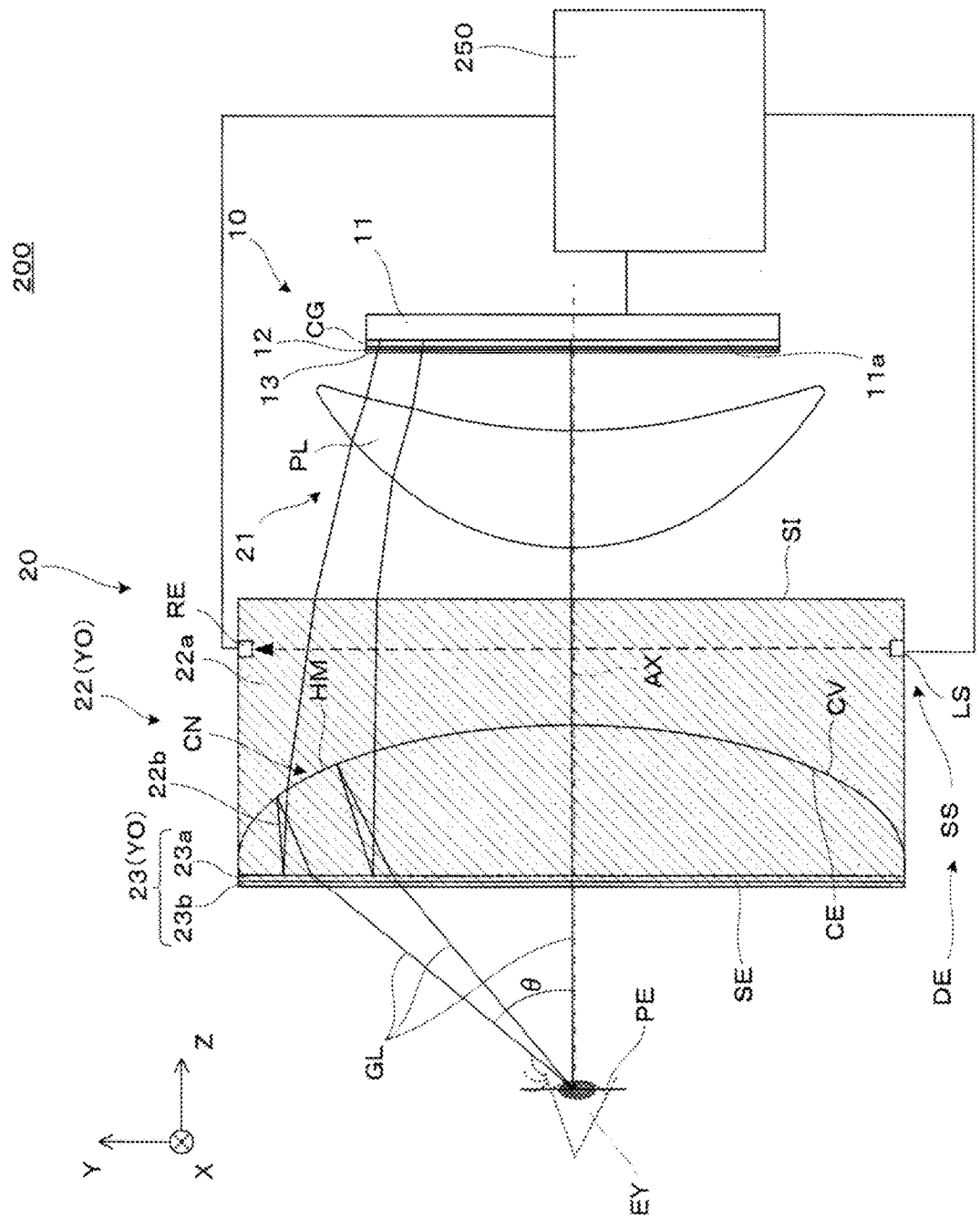
FIG. 11 is a side cross-sectional view conceptually describing an HMD according to a modified example.
Figure 12:
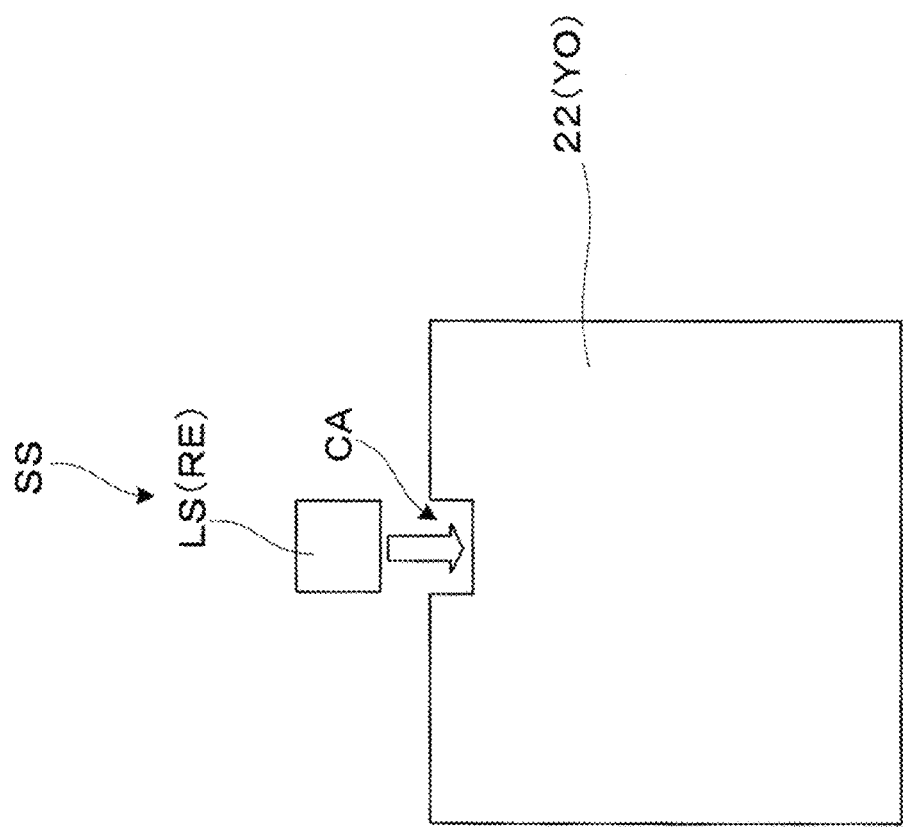
FIG. 12 is a conceptual diagram illustrating an example of disposition of a sensor.
Figure 13:
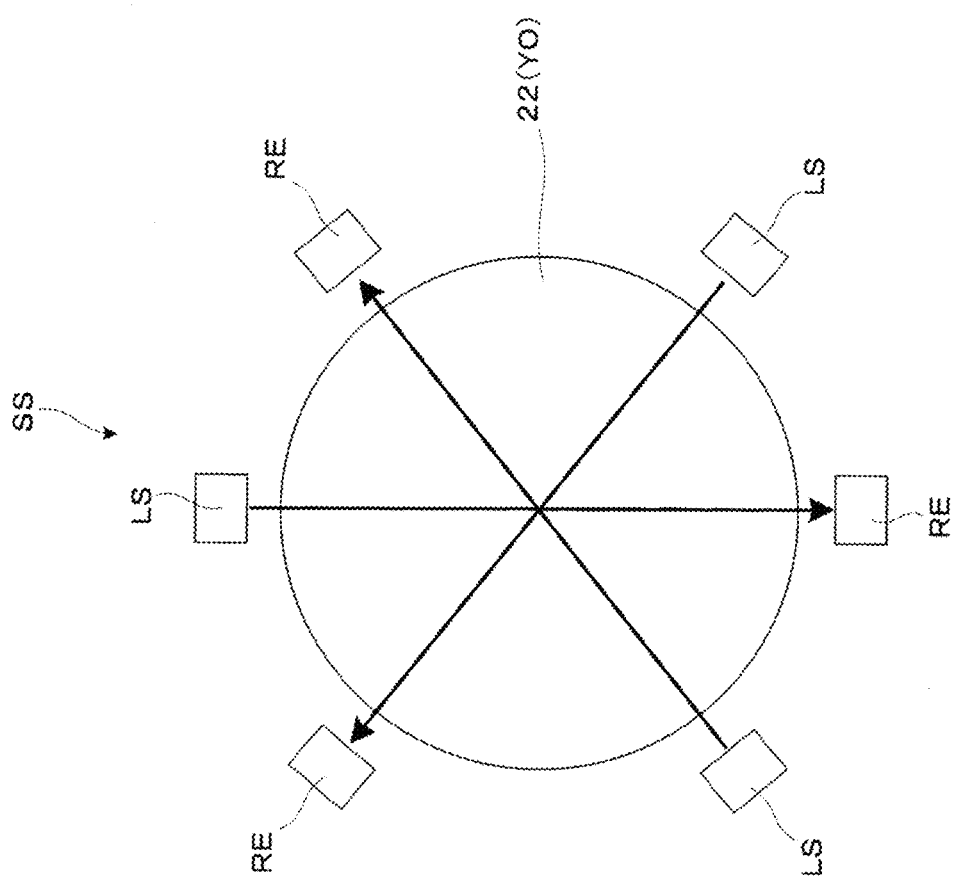
FIG. 13 is a conceptual diagram illustrating disposition of a sensor of a modified example.

In addition, in the above example, the laser light source LS and the light-receiving unit RE are disposed in parallel to or substantially along the optical axis AX, with respect to the sensor SS, however, various aspects are conceivable for the disposition of the sensor SS, and as in a modified example illustrated in FIG. 11, it is conceivable to dispose the sensor SS not in parallel with the optical axis. In this case, by using a laser beam with high directionality as an inspection light beam, it is possible to substantially prevent the inspection light beam from affecting image display by the main operation. Note that, as illustrated in FIG. 12, for assembly of the laser light source LS and the light-receiving unit RE, it is conceivable that, for example, a depression CA for fitting is provided in a part of the yellowing optical member YO, and the laser light source LS and the light-receiving portion RE are mounted and fixed at respective predetermined locations. Furthermore, in the example described above, the sensor SS is constituted by one number of the laser light source LS and one number of the light-receiver RE, however, as conceptually illustrated in FIG. 13, for example, the sensor SS may be configured by surrounding the yellowing optical member YO with a plurality of sets (three sets in the illustrated example) of the laser light sources LS and the light-receiving units RE.

In the present exemplary embodiment as well, white balance adjustment is possible for an image, while being compatible with life-span characteristics that are different for respective wavelength bands on a light-emitting side, and yellowing characteristics in the yellowing optical member YO. In particular, in the present exemplary embodiment, in the HMD 200, by performing measurement and inspection for a current state by the inspection device DE, presence or absence of a deviation from prediction can be checked, and the prediction of the yellowing can be modified as necessary.

Third Exemplary Embodiment

Hereinafter, an example of an HMD according to a third exemplary embodiment will be described with reference to FIG. 14, and the like.

The HMD according to the present exemplary embodiment is a modified example of the HMD and the like illustrated in the second exemplary embodiment, and is similar to the case of the second exemplary embodiment and the like, except for an estimation aspect related to a yellowing degree of a yellowing optical member, thus description of an entirety of the HMD is omitted, and other corresponding figures or the like as necessary are supplementarily used.

Figure 14:
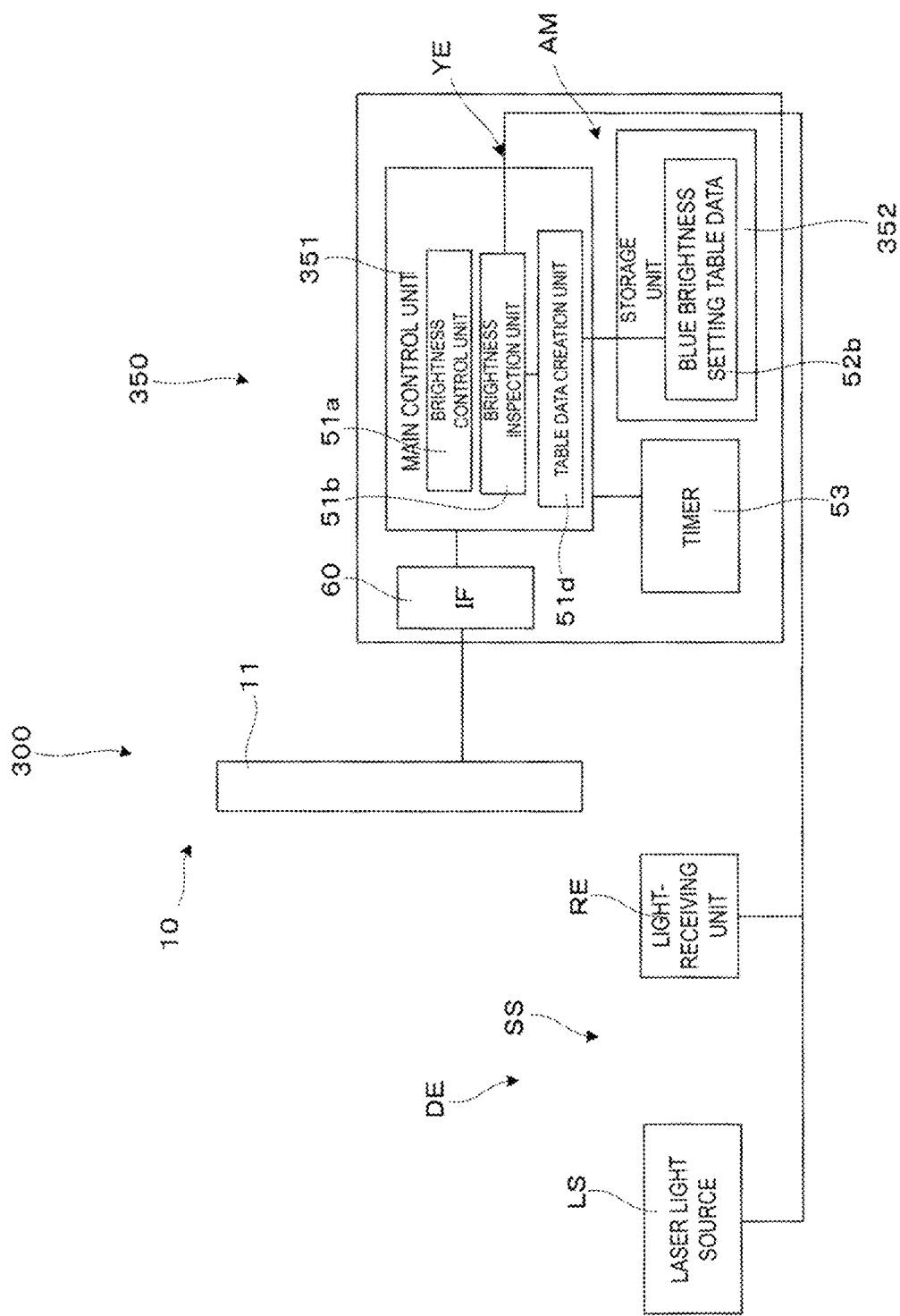
FIG. 14 is a block diagram for describing a configuration example of an image control device of an HMD according to a third exemplary embodiment.

FIG. 14 is a side cross-sectional view conceptually describing an HMD 300 according to the present exemplary embodiment, and is a block diagram corresponding to FIG. 2 and FIG. 9.

As illustrated, the HMD 300 of the present exemplary embodiment includes the image display device 10, an enlargement optical system (including the yellowing optical member YO) not illustrated, and an image control device 350.

The image control device 350 includes a main control unit 351, a storage unit 352, the timer 53, the interface 60, and the sensor SS. Of these, in addition to the luminance control unit 51a, the main control unit 351 includes the luminance inspection unit 51b, and a table data creation unit 51d. Additionally, the storage unit 352 includes luminance setting table data 52b.

Of these, the table data creation unit 51d performs estimation for a yellowing degree of the yellowing optical member YO, that is a change in degree of yellowing, based on an inspection result in the luminance inspection unit 51b, and generates table data for luminance adjustment.

In addition, in the storage unit 352, the luminance setting table data 52b is data (lookup table) created in the main control unit 351. In other words, the present exemplary embodiment differs from the case illustrated in FIG. 9 and the like in that, the storage unit 352 does not have a prediction table data in advance, instead, the luminance setting table data 52b created is used each time. However, at a time of product shipment, that is, in an initial state, initial setting data (data that is subjected to luminance adjustment with a degree of yellowing of the yellowing optical member YO being zero) may be stored in the luminance setting table data 52b.

In the present exemplary embodiment, for example, each time the HMD 300 is activated, measurement (inspection by the inspection device DE) is performed by the sensor SS.

An example of operation of the HMD 300 according to the present exemplary embodiment will be described below with reference to a flowchart in FIG. 15. Note that, here, as an operational example of luminance adjustment associated with yellowing of the yellowing optical member YO using the sensor SS, among various operations, a case will be described in which luminance adjustment of blue light is performed in advance of a main operation when the HMD 200 is activated.

Figure 10:
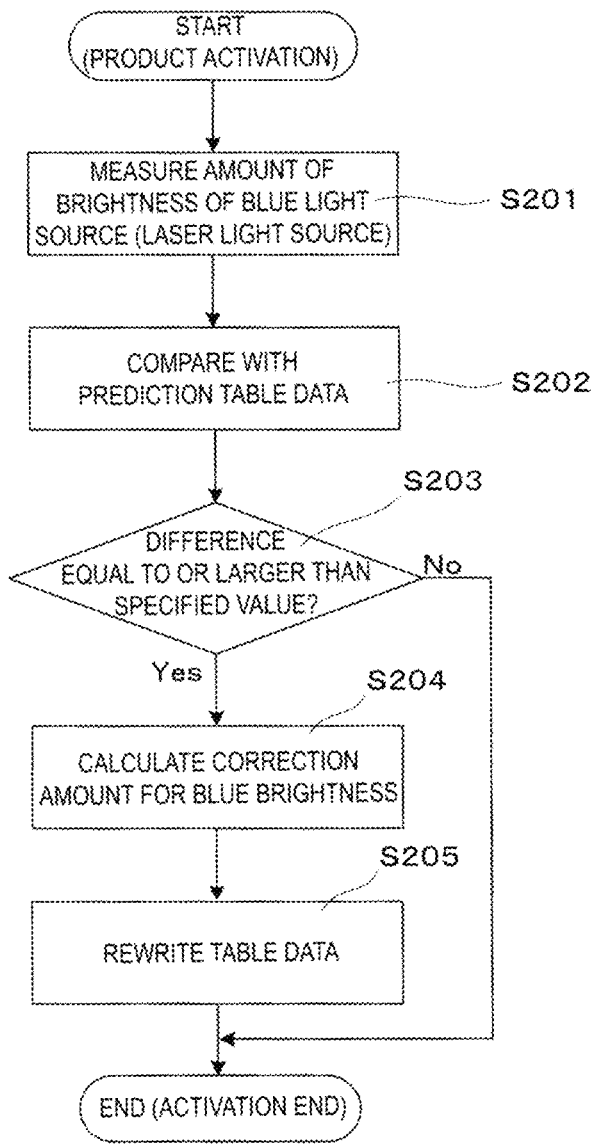
FIG. 10 is a flowchart for describing an example of operation of the HMD.

When respective units of the HMD 300 are activated, as in the example illustrated in FIG. 10, first, the luminance inspection unit 51b of the main control unit 351 performs a luminance inspection based on measurement by the sensor SS (step S301).

Next, the main control unit 351 compares a result of the inspection (measurement result) in step S301 with an amount of luminance at a time of product shipment, that is, in an initial state (step S302), and estimates a yellowing degree at a current time of the yellowing optical member YO. In other words, when a result of the comparison in step S302 indicates that there is no difference from the time of product shipment that is equal to or larger than a specified difference (step S303: No), it is determined that yellowing of the yellowing optical member YO does not occur, and the processing ends without particularly performing a subsequent process.

On the other hand, when the result of the comparison in step S302 indicates that there is a difference from the time of product shipment that is equal to or larger than the specified difference (step S303: Yes), that is, when it is determined that the yellowing of the yellowing optical member YO proceeds to a certain degree or more, in order to rewrite the luminance setting table data 52b, the table data creation unit 51d first calculates a correction amount for luminance of the blue light B (creation of setting table data) (step S304). Thereafter, the table data creation unit 51d stores the setting table data created in step S304 in the storage unit 52 as the luminance setting table data 52b, that is, rewrites the luminance setting table data 52b (step S305), and ends the series of processes. As described above, the luminance adjustment for the luminance of the blue color is performed.

In the present exemplary embodiment as well, white balance adjustment is possible for an image, while being compatible with life-span characteristics that are different for respective wavelength bands on a light-emitting side, and yellowing characteristics in the yellowing optical member YO. In particular, in the present exemplary embodiment, in the HMD 300, the luminance adjustment in accordance with the yellowing can be performed, by performing measurement or inspection for a current state each time, by the inspection device DE.

Fourth Exemplary Embodiment

Figure 16:
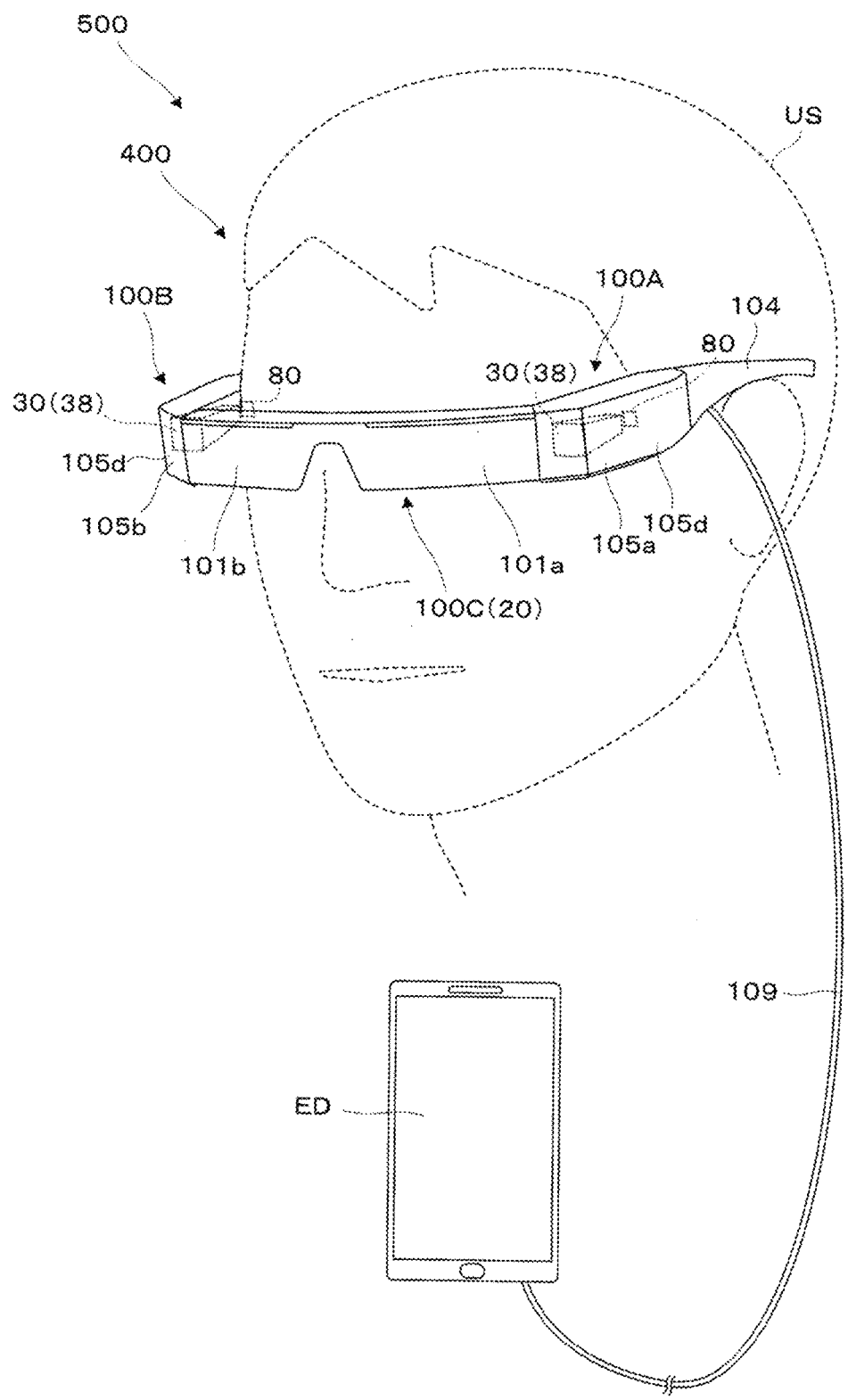
FIG. 16 is a conceptual perspective view illustrating an appearance of an example of an HMD according to a fourth exemplary embodiment.

Hereinafter, an example of an HMD according to a fourth exemplary embodiment will be described with reference to FIG. 16, and the like.

Figure 15:
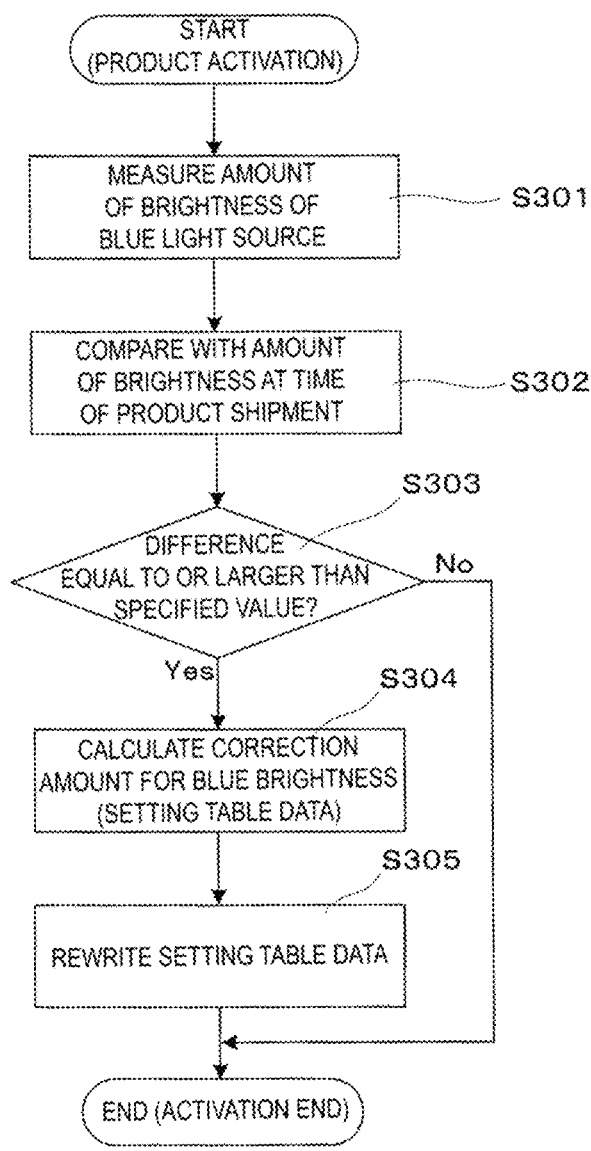
FIG. 15 is a flowchart for describing an example of operation of the HMD.

In the above-described first to third exemplary embodiments, a so-called closed-type configuration has been described in which image display of VR (virtual reality) is caused to be visible, but the present disclosure is not limited thereto, for example, as the example conceptually illustrating the appearance of FIG. 15, a so-called see-through type, that is, an aspect in which a user can be caused to visually recognize or observe an external scene image in a see-through manner is conceivable, for example.

As an HMD 500 according to the fourth exemplary embodiment, in an example illustrated, the HMD 500 includes a wearable display device 400, and an information processing device ED coupled to the wearable display device 400 via a cable 109.

The wearable display device 400 has an eyeglass-like appearance, and is an optical body portion for image formation. The HMD 500 is an optical device that can not only cause a virtual image to be visible to a user (observer) US using the wearable display device 400, but also can cause an external scene image to be visible in a see-through manner.

The information processing device ED is a device that performs various processes on an image to be displayed on the wearable display device 400, outputs an image signal or the like to the wearable display device 400, and can be configured by downloading necessary apps to a smart phone or the like, for example.

The wearable display device 400 is provided with a first display device 100A and a second display device 100B. The first display device 100A and the second display device 100B are units that respectively form a virtual image for a left eye and a virtual image for a right eye. The first display device 100A for the left eye includes a first virtual image forming optical unit 101a that covers a front of the eye of the user (observer) US in a see-through manner, and a first image forming body unit 105a that forms imaging light. The second display device 100B for the right eye includes a second virtual image forming optical unit 101b that covers a front of the eye of the user US in a see-through manner, and a second image forming body unit 105b that forms imaging light. In other words, an image corresponding to the left eye is displayed by the first display device 100A, and an image corresponding to the right eye is displayed by the second display device 100B.

A temple 104, which is a temple portion extending rearward from a side surface of a head, is attached to a rear part of each of the first and second image forming body units 105a and 105b, and a wearing status of the wearable display device 400 is ensured by abutting on an ear, temple, or the like of the user. In addition, the first image forming body unit 105a includes a display element 80, a lens barrel 38 that constitutes a projection lens 30, and the like, inside a cover-like outer packaging case 105d, and similarly, the second image forming body unit 105b includes the display element 80, the lens barrel 38, and the like inside the outer packaging case 105d.

According to the configuration described above, the user (observer) US superposes and visually recognizes an image propagating from the display element 80 through the first virtual image forming optical unit 101a and the like, on an external scene image transmitted through the first virtual image forming optical unit 101a and the like.

Note that, in the above, of the HMD 500, only a portion being the wearable display device 400 may also be considered to be an HMD.

Figure 17:
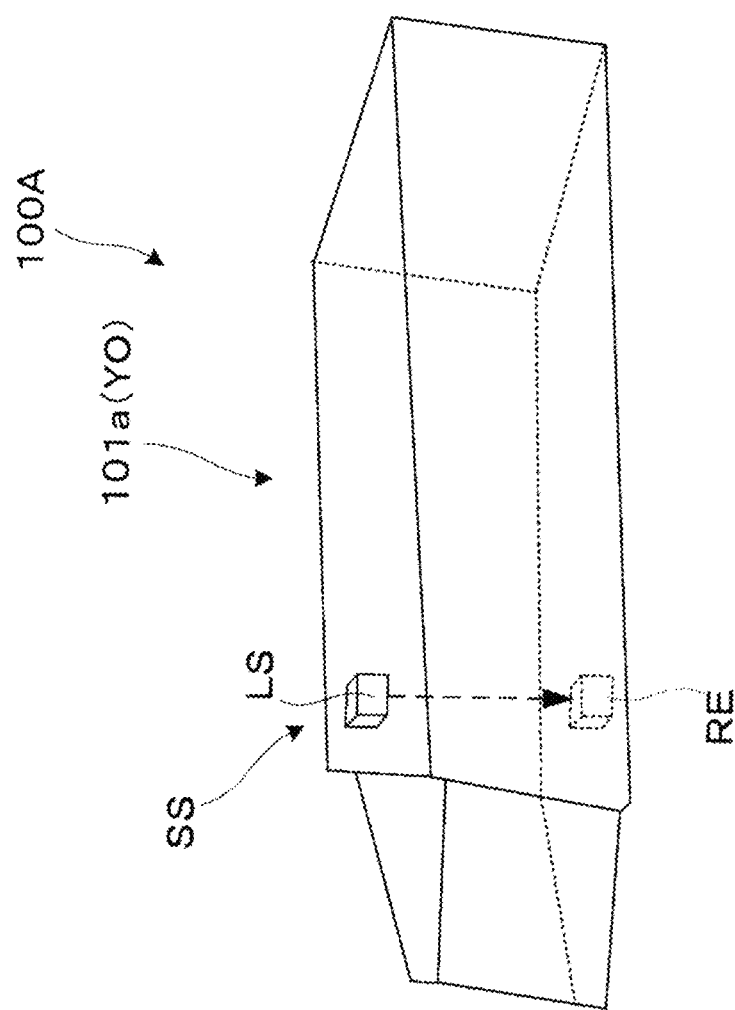
FIG. 17 is a conceptual diagram illustrating an example of disposition of a sensor in a yellowing optical member.

In the above aspect, the first and second virtual image forming optical units 101a, 101b, and the like, disposed on an optical path of imaging light emitted from the display element 80, may be each formed of the yellowing optical member YO that turns yellow with age. In the present exemplary embodiment, for example, as illustrated in FIG. 17, the first virtual image forming optical unit 101a and the like are each formed of the yellowing optical member YO. In this case as well, as illustrated, by providing the laser light source LS and the light-receiving unit RE constituting the sensor SS outside a passage region of imaging light, a yellowing degree of the yellowing optical member YO can be inspected without hindering formation of the imaging light. Note that, for a method of the inspection, the various methods illustrated in the second and third exemplary embodiments can be employed. For example, in the case of see-through type, it is conceivable that an effect of yellowing due to external light may also be large, and there is a possibility that the yellowing does not necessarily proceed as expected. To address the above, as illustrated in the third exemplary embodiment, for example, it is conceivable to adopt an aspect in which inspection is performed each time the HMD 500 is activated.

In the present exemplary embodiment as well, white balance adjustment is possible for an image, while being compatible with life-span characteristics that are different for respective wavelength bands on a light-emitting side, and yellowing characteristics in the yellowing optical member YO. In particular, in the present exemplary embodiment, luminance adjustment in accordance with the yellowing of the yellowing optical member YO can be performed, in the HMD 500 of the see-through type.

Modified Examples and Other Matters

The structure described above is exemplary, and various modifications can be made to the extent that similar functions can be achieved. For example, in the above, an aspect may be adopted in which luminance adjustment of each color light is performed in consideration of deterioration of a light-emitting element itself. In other words, it is conceivable that even when the light-emitting element itself is driven with a constant current value, luminance lowers compared to an initial state according to a lapse of time and frequency of use, and such characteristics can be predicted to some extent depending on a material and the like of the light-emitting element used. For example, in consideration of even this point, by creating prediction table data and performing various operations, it is possible to perform luminance adjustment including the light-emitting element itself.

Further, the technology of the claimed disclosure may also be compatible with a so-called see-through video product constituted by a display and an imaging device.

In addition, in the above description, the image display device 10 is, for example, configured with a self-light-emitting type element (OLED) such as organic EL, but in this case, for example, one that emits circularly polarized imaging light may be adopted, and the polarizing plate or the quarter wavelength plate may be omitted. In this case, an optical member that is unnecessary need not be provided.

Additionally, occurrence of ghost light or the like may further be suppressed by appropriately providing AR coating in a lens surface of each lens.

Additionally, the techniques of the present disclosure are applicable to a binocular type hand held display or the like.

Additionally, in the above description, as for a location in which the half mirror HM including a semi-reflective and semi-transmissive film configured to transmit a portion of imaging light and reflect another portion is provided, for example, it is also conceivable that a function equivalent to an action by the half mirror HM is obtained by providing an optical function surface such as a diffraction element, for example, a volume hologram, instead of the half mirror.

As described above, the head-mounted display (HMD) of the one aspect of the present disclosure includes the display element configured to, for the imaging light including the red light the green light and the blue light display an image with the different opening ratios depending on the respective wavelength bands, the yellowing optical member that is disposed on the optical path of the imaging light emitted from the display element, and turns yellow with age, the yellowing degree estimation unit configured to estimate, by prediction or detection, a yellowing degree of the yellowing optical member with age, and the luminance adjustment unit configured to, depending on the yellowing of the yellowing optical member, based on the data of the yellowing degree estimation unit, adjust luminance of the image in the display element.

In the HMD described above, the display element, for the red light the green light and the blue light has the different opening ratios in accordance with the wavelength bands respectively, and the luminance adjustment unit adjusts luminance of an image, in accordance with the yellowing of the yellowing optical member based on the data. Accordingly, white balance adjustment is possible for an image, while being compatible with life-span characteristics that are different for the respective wavelength bands on a light-emitting side, and yellowing characteristics in the yellowing optical member.

In a specific aspect of the present disclosure, when luminance of blue light in an initial state is $LB_0$, and a degree of yellowing of a yellowing optical member in a current state that turns yellow with age is $\Delta YI$, luminance $LB_x$ of the blue light in a current state satisfies the following formula.

$$LB_0*(0.005*\Delta YI+1) \leq LB_x \leq LB_0*(0.030*\Delta YI+1)$$

In this case, while the degree of yellowing $\Delta YI$ is suppressed, a degree of change in luminance of the blue light falls within a suppressed range with respect to the degree of yellowing $\Delta YI$, and good white balance can be maintained.

In another aspect of the present disclosure, the opening ratio $S_B$ of blue light with respect to an entire opening area satisfies the following formula.

$$0.3 < S_B \leq 0.6$$

In this case, in luminance adjustment of the blue light in accordance with yellowing with age from a time of product shipment, while a luminance lifespan for the blue light is maintained, the luminance adjustment can be performed in consideration of luminance maintenance for other color light components, and the like.

In yet another aspect of the present disclosure, a luminance adjustment unit adjusts luminance among red light, green light and blue light in accordance with a difference between opening ratios. In this case, for each of the color light components, in luminance adjustment with age, balance of colors as a whole can be maintained, while lifespans of respective light-emitting elements are maintained.

In yet another aspect of the present disclosure, in a display element, an opening ratio of blue light is larger than an opening ratio of each of red light, and green light and a luminance adjustment unit increases luminance of each of the red light and the green light to be larger than luminance of the blue light in an initial state, and increases the luminance of the blue light in accordance with yellowing of a yellowing optical member with age. In this case, a difference between the opening ratios can be used to ensure a range of luminance adjustment.

In yet another aspect of the present disclosure, a yellowing degree estimation unit includes prediction table data that is obtained by predicting a yellowing degree of a yellowing optical member with age, based on material properties of the yellowing optical member. In this case, it is possible to estimate the yellowing degree based on the prediction table data.

In yet another aspect of the present disclosure, a yellowing degree estimation unit includes an inspection device that inspects a yellowing degree in a current state of a yellowing optical member. In this case, it is possible to estimate the yellowing degree based on a result of the inspection by the inspection device.

In yet another aspect of the present disclosure, a yellowing degree estimation unit includes prediction table data obtained by predicting a yellowing degree of a yellowing optical member with age based on material properties of the yellowing optical member, and an inspection device that inspects a yellowing degree in a current state of the yellowing optical member, and modifies the prediction table data in accordance with a result of the inspection of the inspection device. In this case, it is possible to estimate the yellowing degree based on the prediction table data, and to modify estimation contents when yellowing deviated from the prediction table data occurs.

In yet another aspect of the disclosure, an inspection device has a sensor that senses blue laser light passing through a yellowing optical member. In this case, the sensor allows a yellowing inspection using the blue laser light.

In yet another aspect of the disclosure, a display element includes a self-light-emitting type element that emits imaging light. In this case, luminance adjustment can be reliably performed in the self-light-emitting type element, and it is possible to reduce a device in size and weight.

In yet another aspect of the present disclosure, a yellowing optical member is a high refractive index member having a higher refractive index than that of any other optical member of optical members disposed on an optical path of imaging light. In this case, even a yellowing member can be used as a high refractive index member to be disposed on the optical path.

In yet another aspect of the present disclosure, a yellowing optical member constitutes a folding optical system. In this case, it is possible to, while reducing a device in size, perform required luminance adjustment.

In yet another aspect of the present disclosure, a folding optical system includes a convex lens having a convex surface on a side of a display element, a concave lens disposed closer to the display element than the convex lens, and having a concave surface that is bonded to the convex surface of the convex lens, and a half mirror provided in a joining section between the convex surface and the concave surface, and the convex lens is a yellowing optical member. In this case, an image having a white balance maintained can be formed while having a wide angle of view in a compact configuration.

What is claimed is:

1. A head-mounted display, comprising:
a display element having a plurality of pixels, each of the plurality of pixels having a pixel area and including a red light pixel having a red light pixel area, a green light pixel having a green light pixel area, and a blue light pixel having a blue light pixel area for imaging light including red light, green light, and blue light, respectively, the red light pixel having a red light opening ratio $S_R$ defined as a ratio of the red light pixel area over the pixel area, the green light pixel having a green light opening ratio $S_G$ defined as a ratio of the green light pixel area over the pixel area, the blue light pixel having a blue light opening ratio $S_B$ defined as a ratio of the blue light pixel area over the pixel area, at least one of the red light opening ratio, the green light opening ratio, and the blue light opening ratio being different from the others of the red light opening ratio, the green light opening ratio, and the blue light opening ratio;
a yellowing optical member that is disposed on an optical path of imaging light emitted from the display element, and turns yellow with age;
a yellowing degree estimation unit configured to estimate, by prediction or detection, a yellowing degree of the yellowing optical member with age; and
a luminance adjustment unit configured to, depending on yellowing of the yellowing optical member, adjust luminance of an image of the display element based on data of the yellowing degree estimation unit, wherein a current luminance of the blue light $LB_x$ satisfies $$LB_0*(0.005*\Delta YI+1) \leq LB_x \leq LB_0*(0.030*\Delta YI+1)$$

wherein an initial luminance of the blue light is $LB_0$, and a current degree of yellowing of the yellowing optical member that turns yellow with age is $\Delta YI$.

2. The head-mounted display according to claim 1, wherein $$0.3 < S_B \leq 0.6.$$

3. The head-mounted display according to claim 1, wherein
the luminance adjustment unit adjusts the luminance between the red light, the green light and the blue light in accordance with a difference between the red light opening ratio, the green light opening ratio, and the blue light opening ratio.

4. The head-mounted display according to claim 1, wherein
in the display element, $S_B$ is larger than $S_R$ and $S_G$, and
the luminance adjustment unit initially sets a luminance of the red light and a luminance of the green light to be larger than a luminance of the blue light, and increases the luminance of the blue light in accordance with yellowing of the yellowing optical member with age.

5. The head-mounted display according to claim 1, wherein
the yellowing degree estimation unit includes prediction table data that is obtained by predicting a yellowing degree of the yellowing optical member with age based on material properties of the yellowing optical member.

6. The head-mounted display according to claim 1, wherein
the yellowing degree estimation unit includes an inspection device that inspects a current yellowing degree of the yellowing optical member.

7. The head-mounted display according to claim 6, wherein
the inspection device has a sensor that senses blue laser light passing through the yellowing optical member.

8. The head-mounted display according to claim 1, wherein
the yellowing degree estimation unit includes prediction table data obtained by predicting a yellowing degree of the yellowing optical member with age based on material properties of the yellowing optical member, and an inspection device that inspects a current yellowing degree of the yellowing optical member, and modifies the prediction table data in accordance with a result of the inspection by the inspection device.

9. The head-mounted display according to claim 1, wherein
the display element includes a self-light-emitting type element that emits the imaging light.

10. The head-mounted display according to claim 1, wherein
the yellowing optical member is a high refractive index member having a higher refractive index than that of another optical member among optical members disposed on an optical path of the imaging light.

11. The head-mounted display according to claim 1, wherein
the yellowing optical member constitutes a folding optical system.

12. The head-mounted display according to claim 11, wherein
the folding optical system includes a convex lens having a convex surface on a side of the display element, a concave lens disposed closer to the display element than the convex lens is, and having a concave surface that is joined to the convex surface of the convex lens, and a half mirror provided at a joining section between the convex surface and the concave surface, and
the convex lens is the yellowing optical member.

* * * * *